(12) United States Patent
Van Endert et al.

(10) Patent No.: US 7,933,176 B2
(45) Date of Patent: Apr. 26, 2011

(54) APPARATUS AND METHOD FOR DETERMINING WRITE STRATEGY PARAMETERS FOR RECORDING DATA ON AN OPTICAL RECORD CARRIER AND FOR DETERMINING READ PARAMETERS FOR READING DATA FROM AN OPTICAL RECORD CARRIER

(75) Inventors: Tony Petrus Van Endert, Eindhoven (NL); Erno Fancsali, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 789 days.

(21) Appl. No.: 11/908,137

(22) PCT Filed: Mar. 9, 2006

(86) PCT No.: PCT/IB2006/050745
§ 371 (c)(1),
(2), (4) Date: Sep. 10, 2007

(87) PCT Pub. No.: WO2006/097873
PCT Pub. Date: Sep. 21, 2006

(65) Prior Publication Data
US 2008/0205210 A1    Aug. 28, 2008

(30) Foreign Application Priority Data
Mar. 15, 2005 (EP) ..................... 05102023

(51) Int. Cl.
*G11B 7/00* (2006.01)
(52) U.S. Cl. ..................... 369/44.27
(58) Field of Classification Search .......... None
See application file for complete search history.

(56) References Cited

U.S. PATENT DOCUMENTS 6,952,382 B2 * 10/2005 Nishiuchi ............ 369/44.29
7,006,414 B2 *  2/2006 Ohba .................. 369/47.53

(Continued)

FOREIGN PATENT DOCUMENTS

JP          2004246956          9/2004

OTHER PUBLICATIONS

Langereis, G.: "Surface Response Methodology for Write Strategy Optimisation in Optical Drives"; Japanese Journal of Applied Physics, vol. 43, No. 8A, pp. 5623-5629, 2004.

*Primary Examiner* — Daniell L Negrón
*Assistant Examiner* — Henok Heyi
(74) *Attorney, Agent, or Firm* — Edward W. Goodman

(57) ABSTRACT

The present invention relates to an apparatus and a corresponding method for determining write strategy parameters for recording data on an optical record carrier (100) and to an apparatus and a corresponding method for determining read parameters for reading data from an optical record carrier (100). In order to provide an improved apparatus and method which can be easily implemented in practice, require only a short amount of time and allow for determination of optical write strategy parameters also for discs when also write strategy stored in a media table in the drive, an apparatus for determining write strategy parameters is proposed comprising: initialization means (110) for setting initial write strategy parameters, —setting means (120) for setting initial variable levels and an initial experimental plan, based on variations of said initial write strategy parameters, for use in a design of experiments method for optimization of said write strategy parameters, optimization means (130) for determining optimized write strategy parameters by use of a design of experiments method, and—iteration means (140) for checking if, based on a predetermined criterion, the optimized write strategy parameters determined by the optimization means (130) shall be further optimized and, in case the write strategy parameters shall be further optimized, for determining new variable levels and a new experimental plan for use in another iteration of the design of experiments method for further optimization of said write strategy parameters.

19 Claims, 17 Drawing Sheets

U.S. PATENT DOCUMENTS

Figure 1:
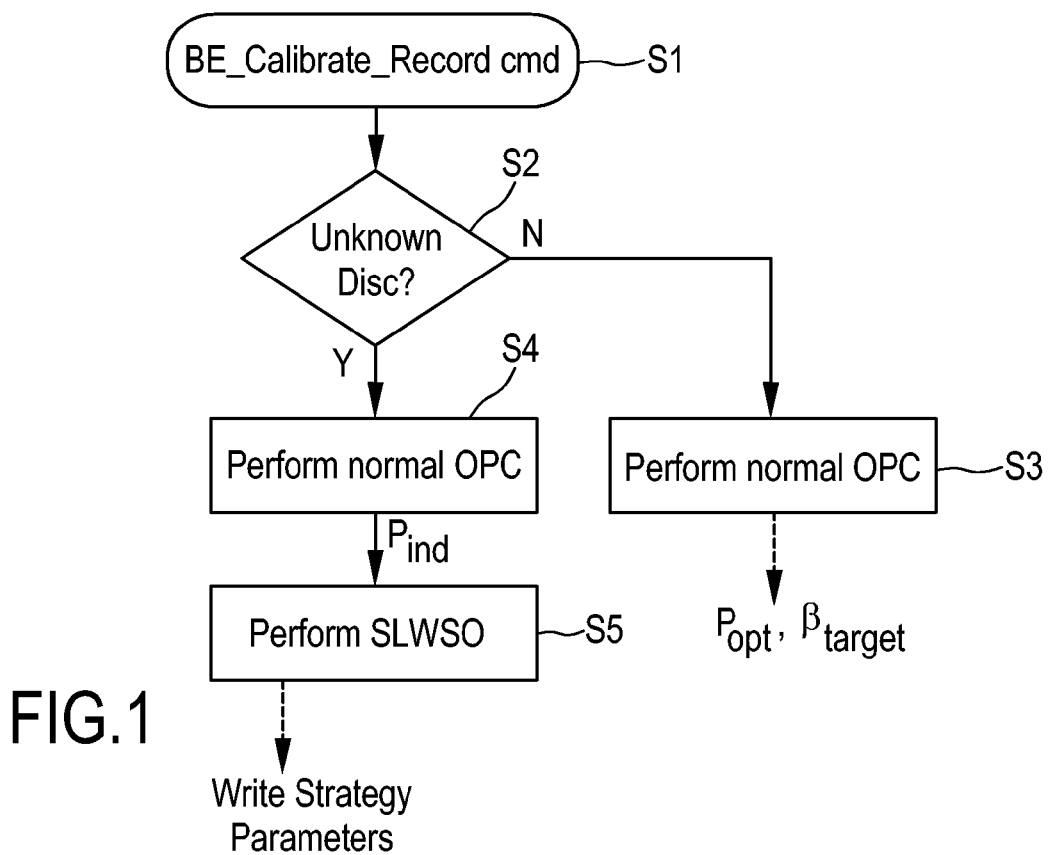

| | | | |
|---|---|---|---|
| 7,123,562 B2 * | 10/2006 | Langereis | 369/47.51 |
| 2002/0126604 A1 * | 9/2002 | Powelson et al. | 369/47.53 |
| 2004/0160873 A1 | 8/2004 | Pereira | |
| 2005/0073929 A1 * | 4/2005 | Mutou | 369/53.35 |
| 2005/0088940 A1 * | 4/2005 | Toda et al. | 369/53.27 |
| 2005/0286382 A1 * | 12/2005 | Okamoto | 369/59.1 |

* cited by examiner

APPARATUS AND METHOD FOR DETERMINING WRITE STRATEGY PARAMETERS FOR RECORDING DATA ON AN OPTICAL RECORD CARRIER AND FOR DETERMINING READ PARAMETERS FOR READING DATA FROM AN OPTICAL RECORD CARRIER

The present invention relates to an apparatus and a corresponding method for determining write strategy parameters for recording data on an optical record carrier. The present invention relates further to an apparatus and a corresponding method for determining read parameters for reading data from an optical record carrier. Still further, the present invention relates to an apparatus and a corresponding method for determining servo parameters for recording data on and/or reading data from an optical record carrier.

To write properly on an optical disc a laser is controlled with a certain pattern, a so-called write strategy. Mostly, but not always, write strategies are stored on the disc, for instance as ADIP info for DVD recordable and rewritable discs. But this information is not always correct or the optimum write strategy because the write strategy tuned by the disc manufacturer is generally done on a certain reference drive. The optical path of these reference drives is different compared with practical optical drives. Therefore, write strategies for different types of discs are often also stored in the drive in a media table (during development). This involves the problem that unknown or newly developed types of discs are not mentioned in the media table. In this case the drive uses the write strategy stored on the disc. As mentioned above this is not the optimal one, and depending on the system margins drive manufacturers have it is possible that certain discs on a certain speed are not written properly.

The article of G. Langereis "Surface Response Methodology for Write Strategy Optimisation in Optical Drives", Japanese Journal of Applied Physics, Vol. 43, No. 8A, pp. 5623-5629 describes a write strategy optimization algorithm. In particular, a castle strategy comprising thermal balancing for marks after a 3 T space and improved in-mark temperature compensation by means of a notch in the larger marks and a response surface methodology using a design of experiments (DOE) method are described therein. However, this algorithm have disadvantages in an implementation in practical optical drives. In particular, no search possibilities are available and not many parameters are included in the algorithm.

A similar problem appears during the reproduction of data stored on an optical record carrier. Playability tuning of an optical disc is very time consuming. Compromises of parameters have to be made between different disc defects (like scratches, fingerprints, dust, etc) and shock behavior. The playability is generally tuned during the development phase of a project. Parameter spread/drift in the field could give data errors during reading depending on system margins. For example, in automotive applications very low failure rates (e.g. 10 ppm) are expected in very variable environments/ conditions as function of time.

It is an object of the present invention to provide improved apparatuses and methods for determining write strategy parameters and read parameters, respectively, which can be easily implemented in practice, require only a short amount of time and allow for determination of optimal write strategy parameters and read parameters, respectively, also for discs where no write strategy and read strategy, respectively, is stored in a media table in the drive.

The object is achieved according to the present invention by an apparatus for determining write strategy parameters as claimed in claim 1 comprising:

initialization means for setting initial write strategy parameters, setting means for setting initial variable levels and an initial experimental plan, based on variations of said initial write strategy parameters, for use in a design of experiments method for optimization of said write strategy parameters, optimization means for determining optimized write strategy parameters by use of a design of experiments method, and iteration means for checking if, based on a predetermined criterion, the optimized write strategy parameters determined by the optimization means shall be further optimized and, in case the write strategy parameters shall be further optimized, for determining new variable levels and a new experimental plan for use in another iteration of the design of experiments method for further optimization of said write strategy parameters.

Further, the object is achieved according to the present invention by an apparatus for determining read parameters as claimed in claim 3 comprising:

initialization means for setting initial read parameters, setting means for setting initial variable levels and an initial experimental plan, based on variations of said initial read parameters, for use in a design of experiments method for optimization of said read parameters, optimization means for determining optimized read parameters by use of a design of experiments method, and iteration means for checking if, based on a predetermined criterion, the optimized read parameters determined by the optimization means shall be further optimized and, in case the read parameters shall be further optimized, for determining new variable levels and a new experimental plan for use in another iteration of the design of experiments method for further optimization of said read parameters.

Corresponding methods are defined in claims 15 and 16. Preferred embodiments of the invention are defined in the dependent claims.

The invention is based on the idea that the write strategy parameters that should be used for recording on a disc and the read parameters that should be used for reading data from a disc are dependent on the disc, recorder and recording speed and disc, reader and reading speed, respectively. For unknown discs the write strategy parameters/read parameters should be determined for each recorder/disc combination and reader/disc at the actual recording speed/reading speed. Such a self learning optimization procedure for determination of the write strategy parameters and read parameters is proposed according to the present invention.

In particular, the present invention first proposes to make a first optimization run using a known design of experiments method. Such a method is, generally, a structured, organized method for determining the relationship between factors effecting a process and the output of that process. I.e., a design of experiments refers to experimental methods used to quantify indeterminate measurements of factors and interactions between factors statistically through observants of forced changes made methodically as directed by mathematically systematic tables. For performing this first run initial write strategy parameters/read parameters (in the following also commonly referred to as "initial parameters"), initial variable levels and an initial experimental plan are determined. Said initial parameters are, for instance, read from the record carrier itself, or can be taken from a default write strategy/read strategy stored in the apparatus itself. Write strategy parameters are, for example, the recording power, the cooling gaps (of even and odd marks), the power increment, and time increments. These parameters are generally pre-stored on the record carrier, for instance in the ATIP (Absolute Time In Pregroove) information on recordable CDs or in the ADIP (Absolute Address In Pregroove) on recordable DVD+R discs. Read parameters are, for example, servo parameters like radial, focus bandwidths, decoder parameters like equalizer, slicer, and PLL bandwidth.

From these parameters a group of parameters is selected, in particular one or two parameters (more parameters at the same time are possible, but this complicates the calculations), from which the initial variable levels and the initial experimental plan for the design of experiments method are determined. For instance, for DVD recordable discs the recording power Pw and the write pulse duration for 3 T marks Ti3 are selected as write parameters which shall be optimized by the design of experiments method. Preferably said parameters have a specific correlation. Thus, different combinations of variations of these parameters are determined (in "coded" or "normalized" form) as variable levels and set as in experimental plan. Preferably, for determining optimized write strategy parameters, a number of test recordings according to said experimental plan is carried out writing test data on the record carrier using said combinations of write strategy parameters as set in the experimental plan.

Similarly, for determining optimized read parameters, a number of test readings according to said experimental plan is carried out reading test data from the record carrier using said combinations of read parameters as set in the experimental plan. Instead of reading test data from a record carrier, test discs (also discs that are used in the market) with disc errors or disc defects like fingerprints, black dots, scratches, etc are used for this purpose in the same way. These discs will be used during development to simulate the discs available in the market.

As a result optimized write strategy parameters/optimized read parameters (in the following also commonly referred to as "optimized parameters") are obtained by said design of experiments method. Thereafter it is checked, if further optimization is required using a predetermined criterion, for instance the resulting jitter obtained by said different experiments during the first run of the design of experiments method.

If no further optimization is required, the determined optimized parameters will be used for recording on said record carrier and reading data from said record carrier, respectively. Otherwise, an iteration is started and another run of the design of experiments method will be made using new variable levels and a new experimental plan which are determined based on the results obtained during the previous run of the design of experiments method. These iterations can be carried out one or more times, until said predetermined criterion is fulfilled, for instance, if the jitter is below a predetermined threshold, if a predetermined number of iterations has been carried out and/or if no further significant improvement could be obtained by the last iteration.

The present invention thus provides a simple and time-efficient method for obtaining optimized parameters for optical record carriers. This method is preferably used for optical record carriers which are "unknown" to the drive, i.e. for which there are no write strategy parameters/read parameters stored in the drive, for instance in a media table. However, the method can also be used for record carriers where not even on the record carrier itself any write strategy parameters/read parameters are stored, or it can also be used in order to further optimize the write strategy parameters/read parameters stored on the record carrier or stored in the drive. For each individual disc the best way to record on the disc/read from the disc can be rapidly determined leading to reliable data recording/reading, the reliable data recording leading subsequently to a reliable playback of recorded data for all kinds of record carriers. Furthermore, this solution is future-proof to support all new media from existing and new media manufacturers. Compared to other known solutions which can take up to twenty minutes to complete a write strategy optimization, the proposed self-learning strategy optimization takes only a few seconds.

A preferred embodiment of the optimization means comprises test recording means/test reading means, measurement means for measuring a quality parameter value of a quality parameter and determination means for determining the optimized parameters by evaluation of the measured quality parameter values for the test recordings/test readings. Such quality parameters can, for instance, be jitter, block error rate or bit error rate which are preferably measured after each test recording/test reading.

It is further preferred, that a model is used for determining the optimized parameters, in particular a second-order model, and that for this model an optimum, in particular a minimum, is determined for finding the optimized parameters. Such a second-order model is preferred since it has been shown (see FIGS. 3 and 4 of the above mentioned article of G. Langereis) that both the leading and trailing jitter have a parabolic dependency on the write strategy parameters and that also the RMS value (being the total jitter) has a second order shape as well. However, generally, also other models can be used.

Another advantage of such a model is that the coefficient values of the model can, as proposed according to a preferred embodiment, also be used as predetermined criterion for checking if a further optimization of the determined parameters shall be made, i.e. if another iteration run is required. For instance, in case of a second-order model, the coefficient values of the coefficients of the quadratic terms of said model are used for this purpose which can well indicate if an optimum (i.e. a minimum) of the model has been found or if any further optimization is required. Furthermore, said coefficient values can also be used to indicate the iteration direction, i.e. the direction in which way, i.e. in which direction and by which operation (increasing/decreasing/shifting) the previous variable levels have to be changed for determining a new experimental plan to be used in another iteration.

The proposed invention can also be used for calibration of other parameters than write strategy parameters and read parameters, i.e. servo parameters, like focus offset v.s. radial tilt calibration, or spherical aberration v.s. focus offset, etc. An apparatus and a method according to the invention for determining servo parameters for recording data on and/or reading data from an optical record carrier are defined in claims 17 to 19.

Figure 3:
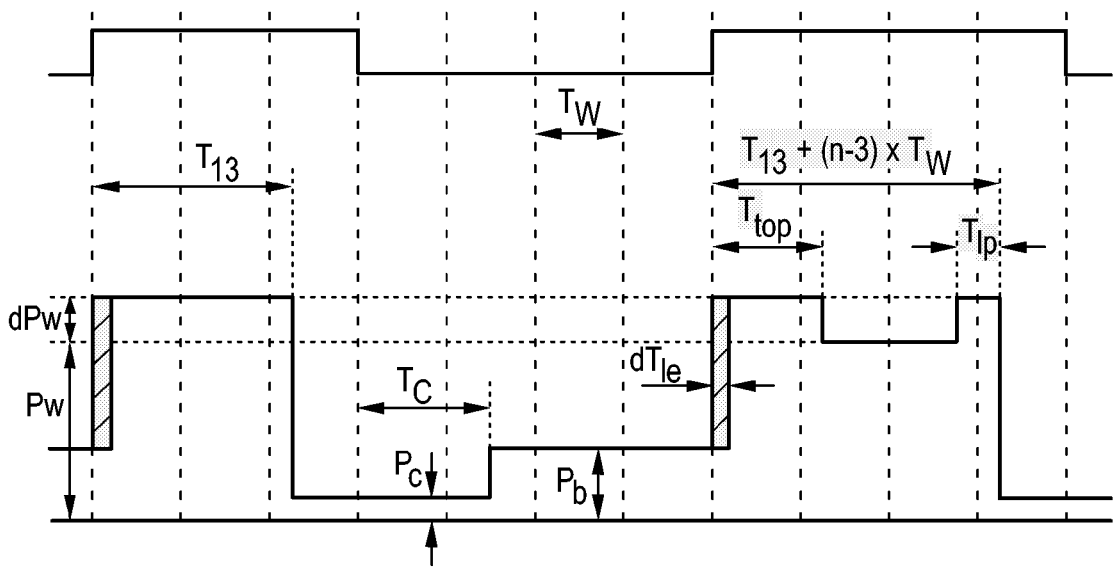
Figure 2:
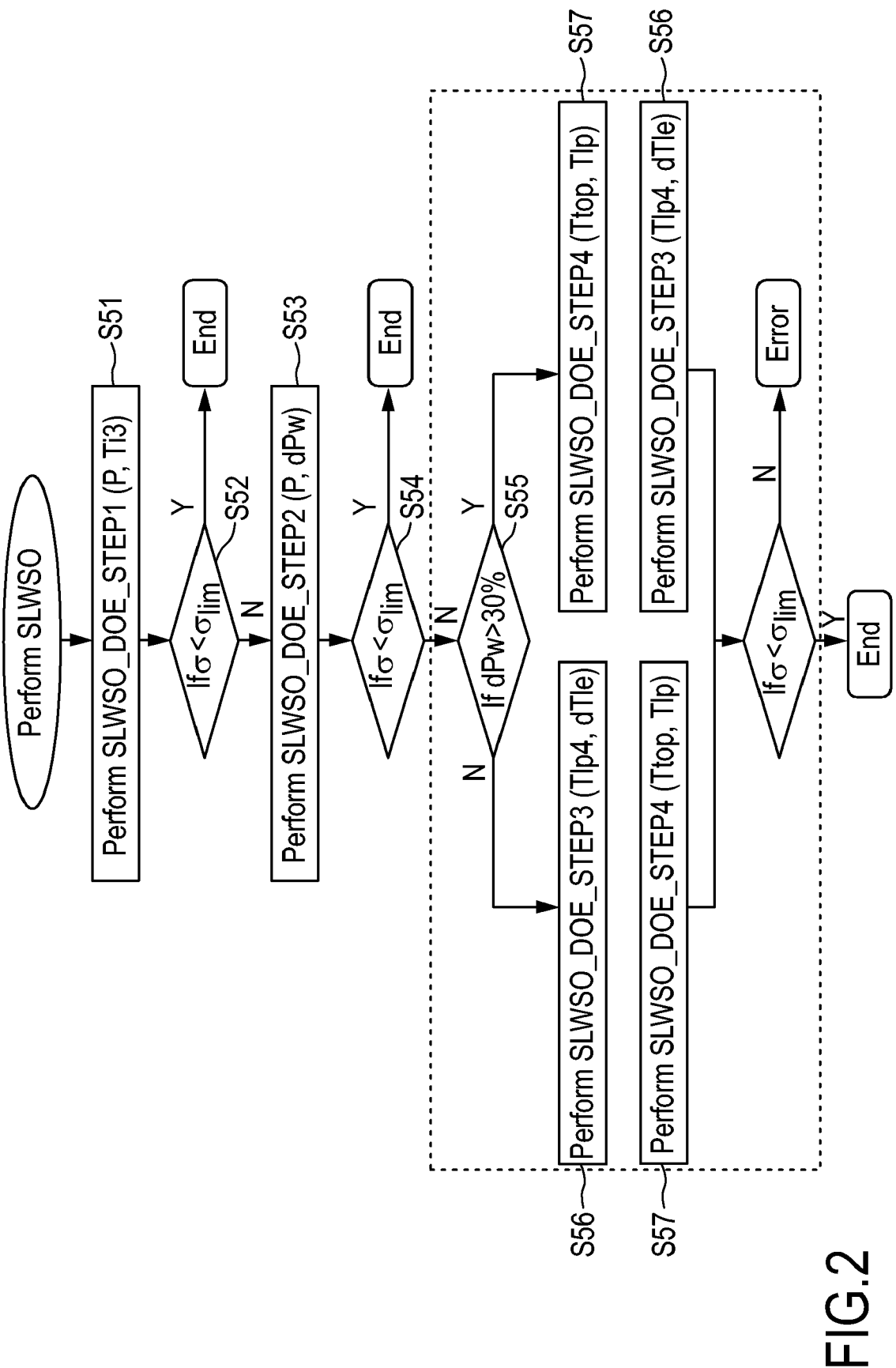
Figure 4:
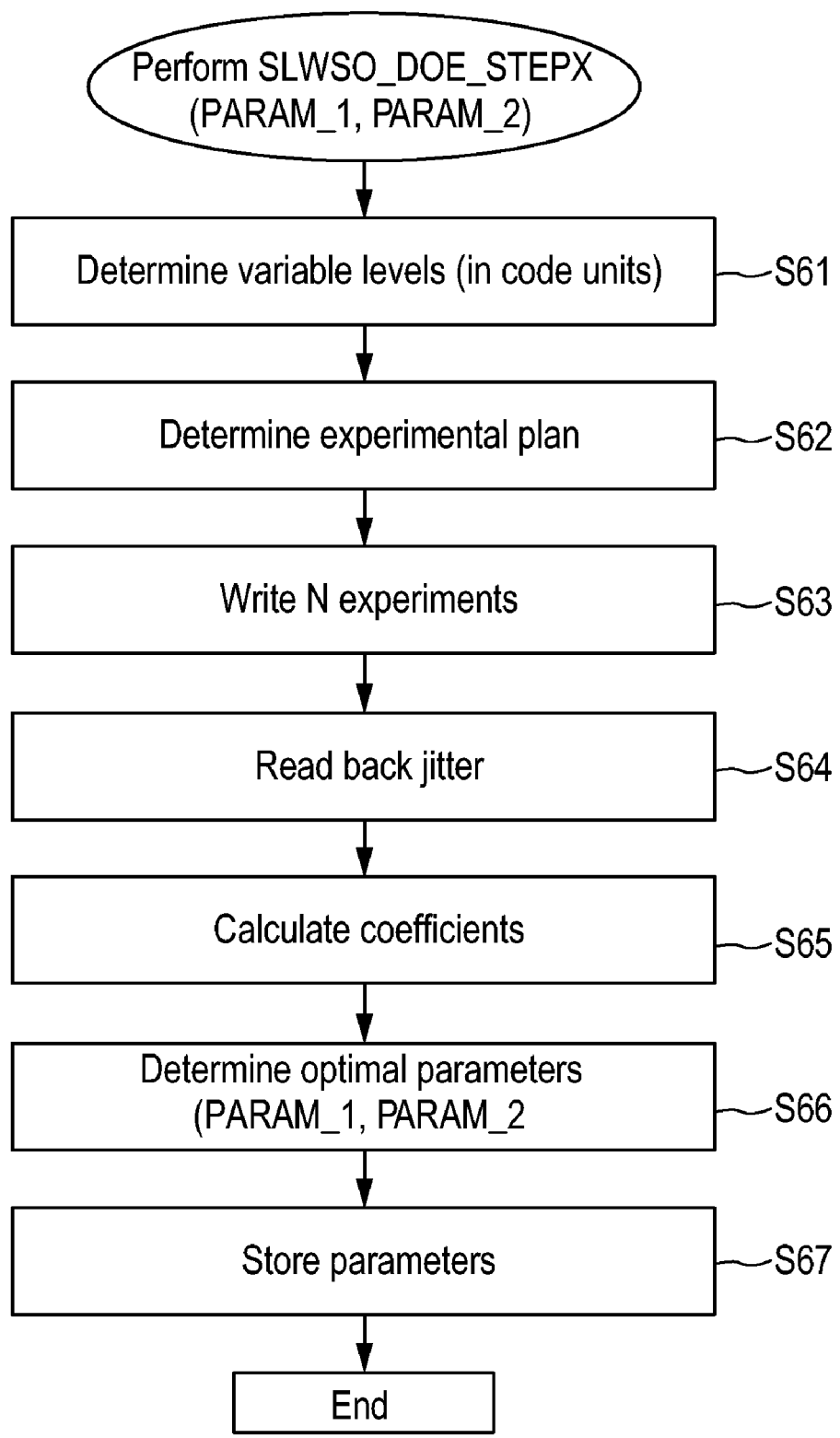
Figure 5:
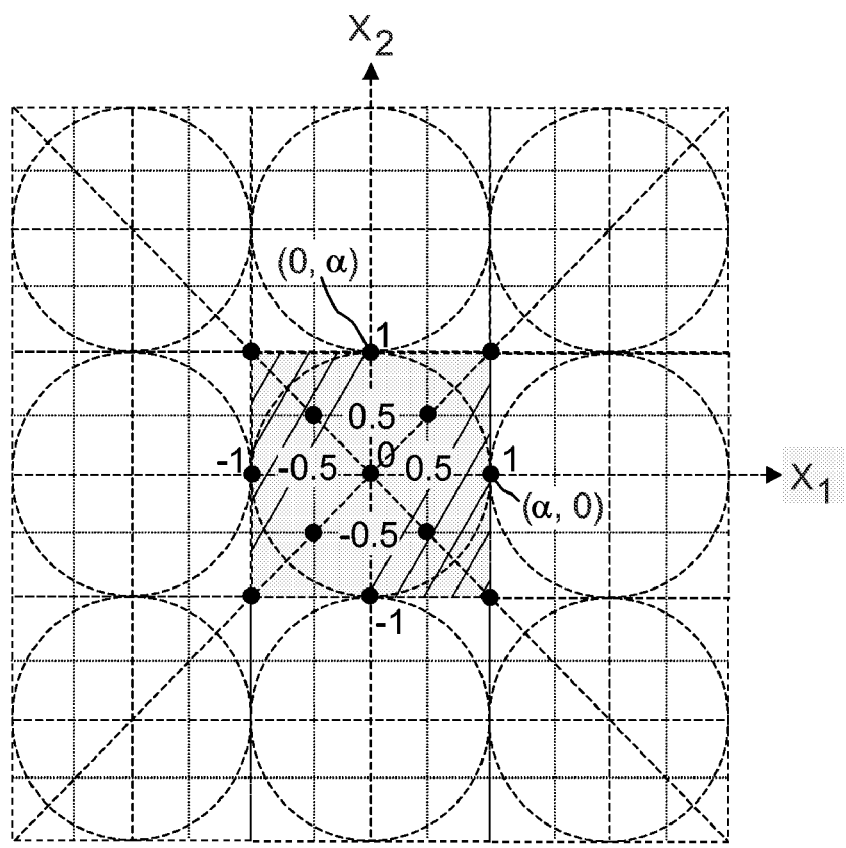
Figure 6:
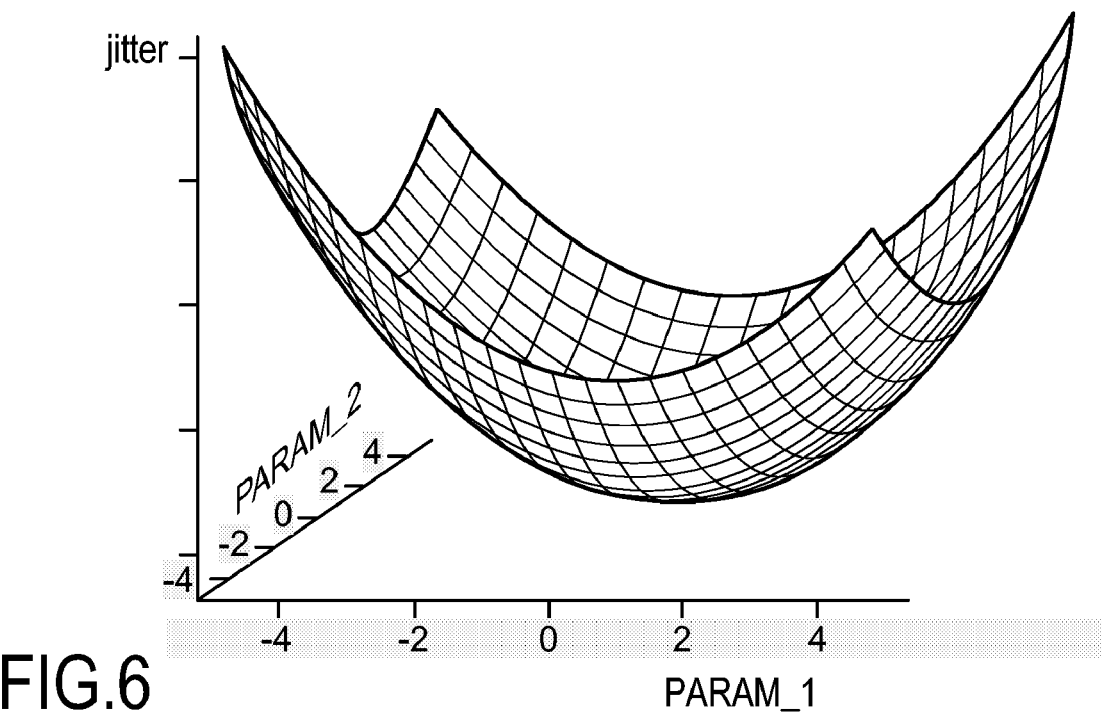
Figure 7:
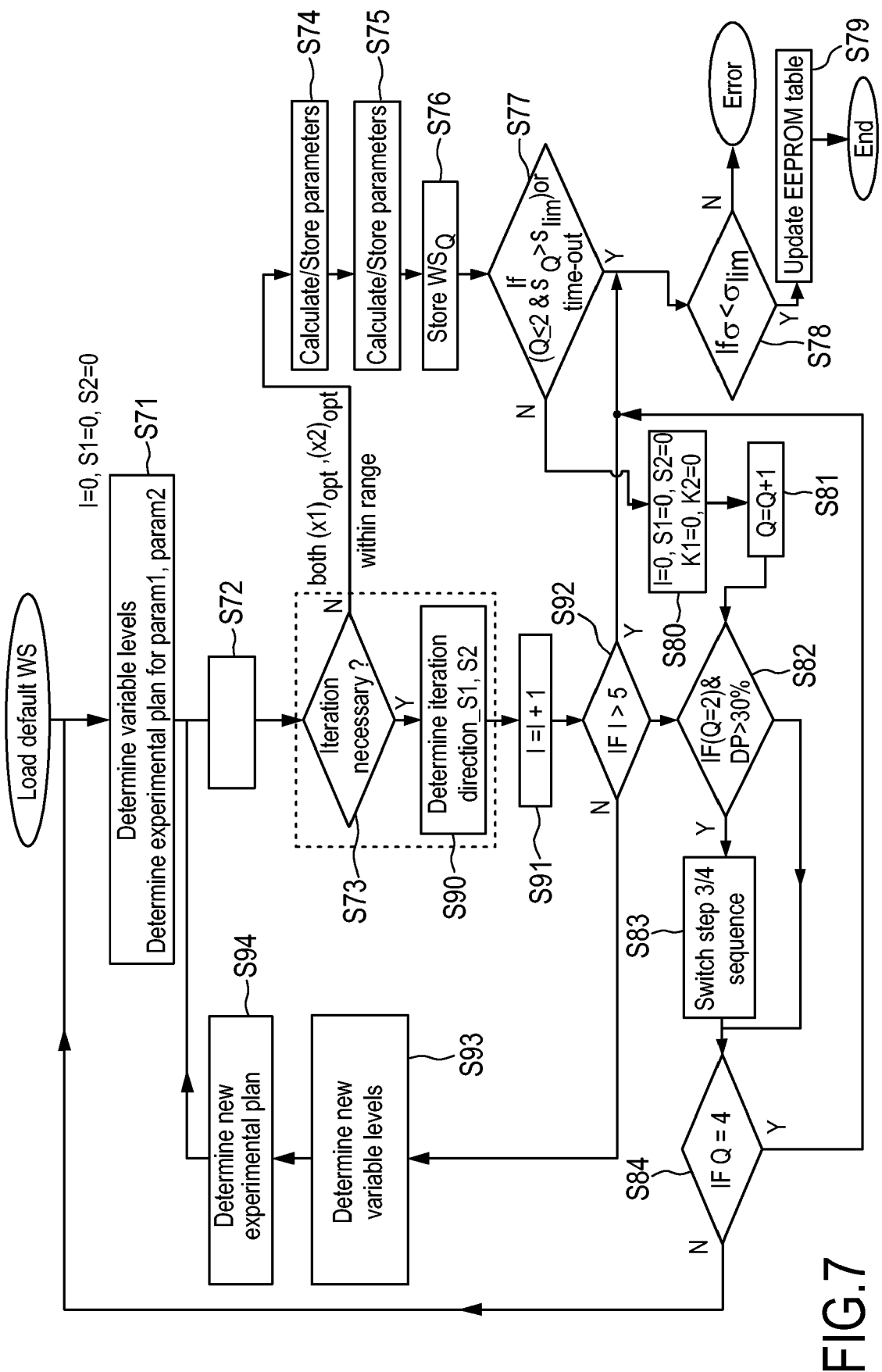
Figure 8:
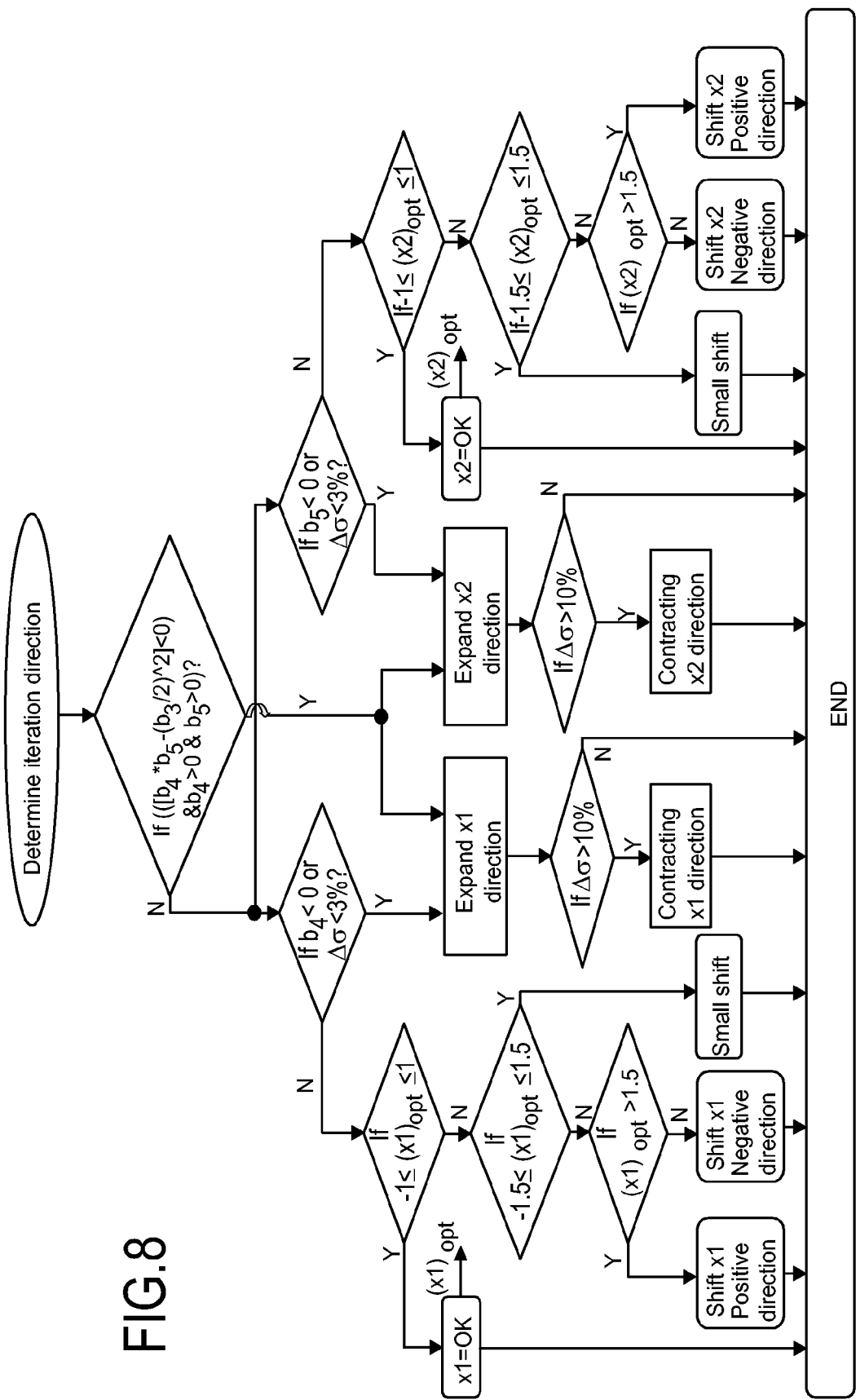
Figure 9A:
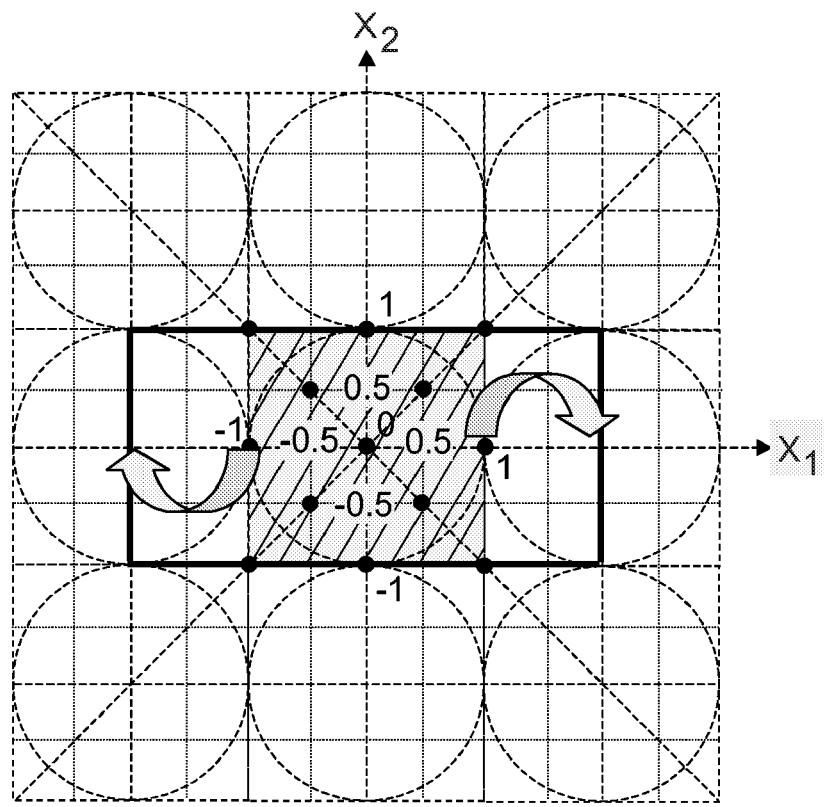
Figure 9B:
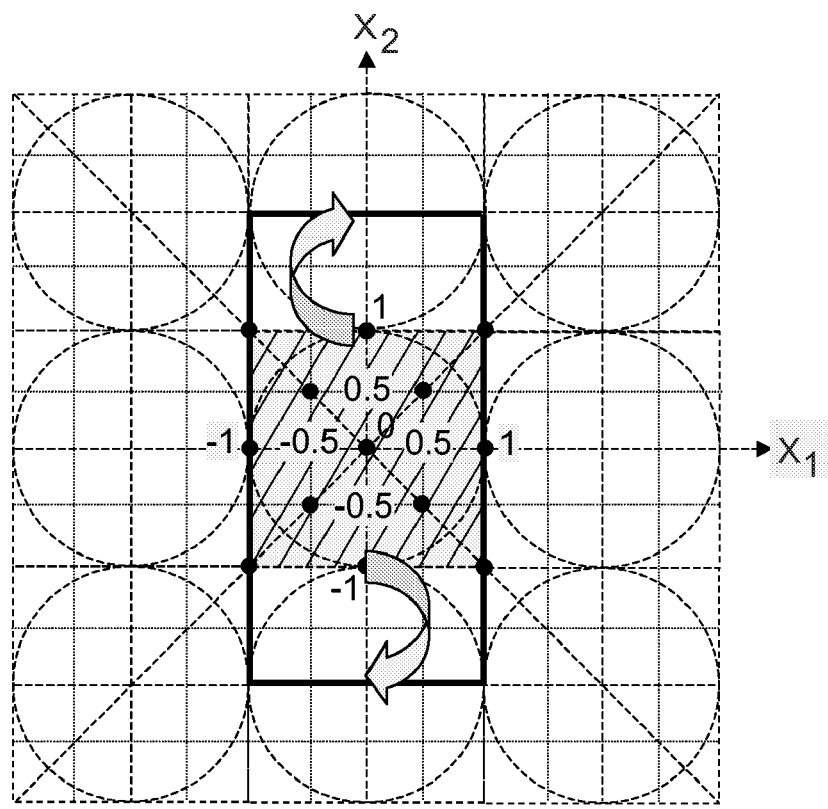
Figure 9C:
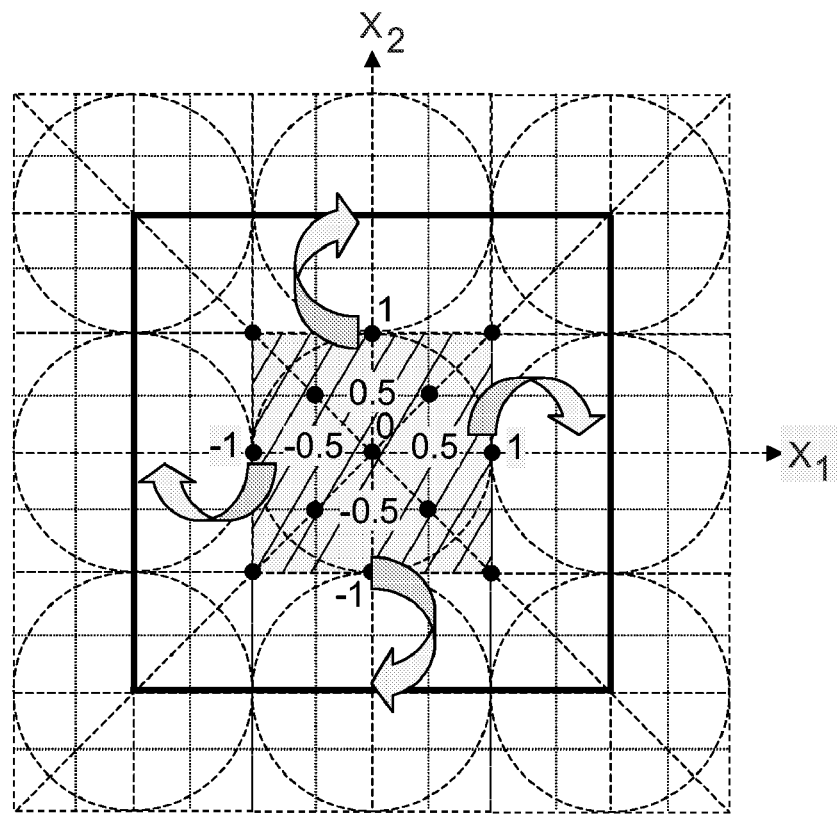
Figure 9D:
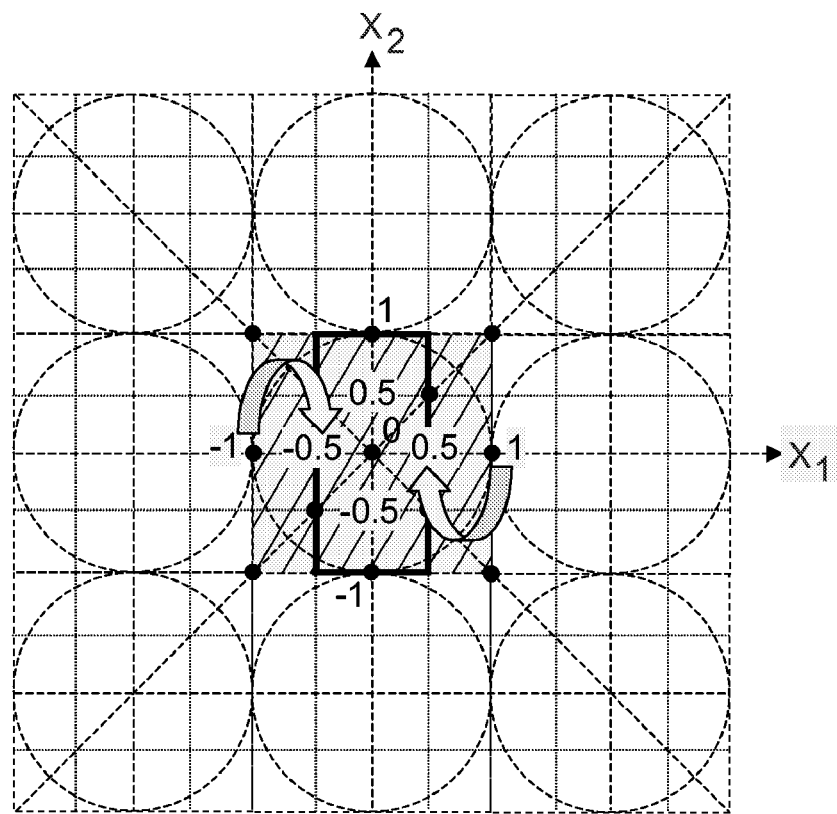
Figure 9E:
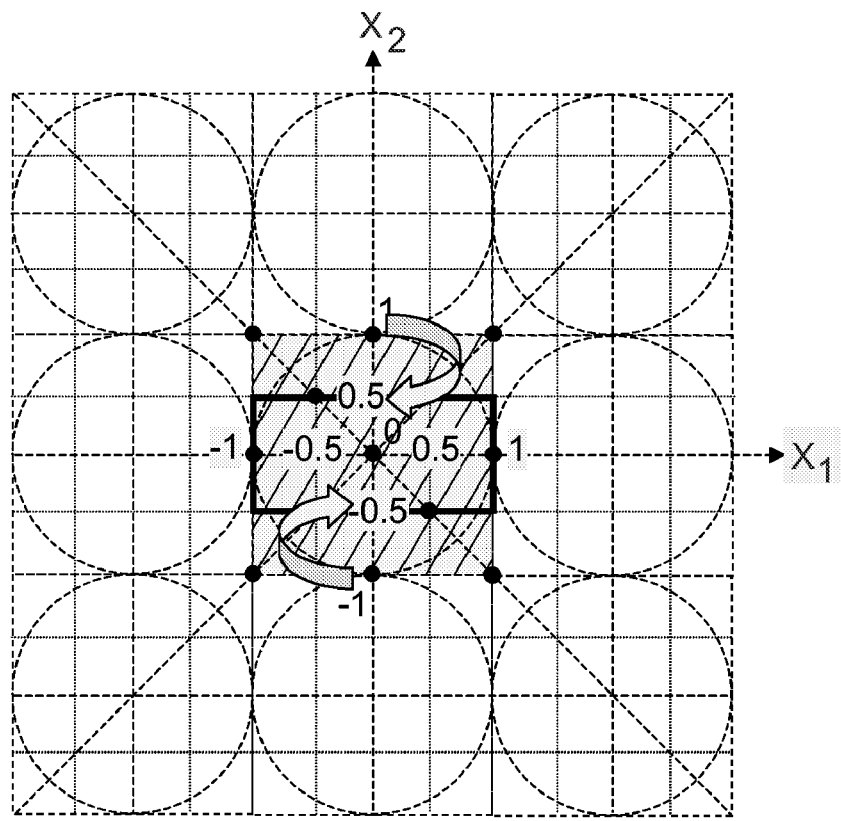
Figure 9F:
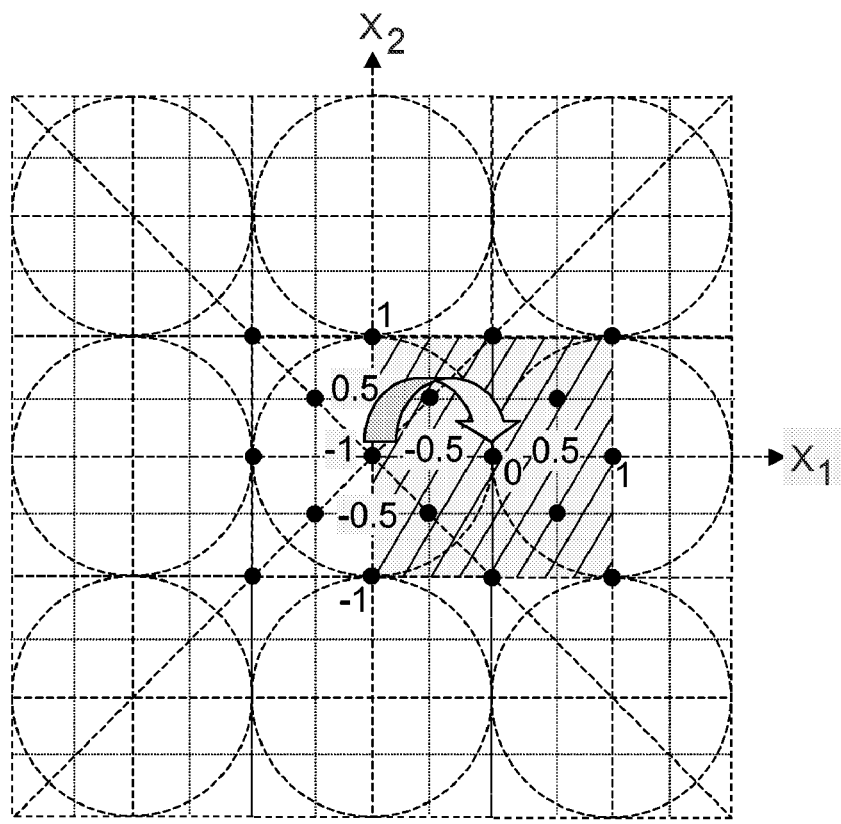
Figure 9G:
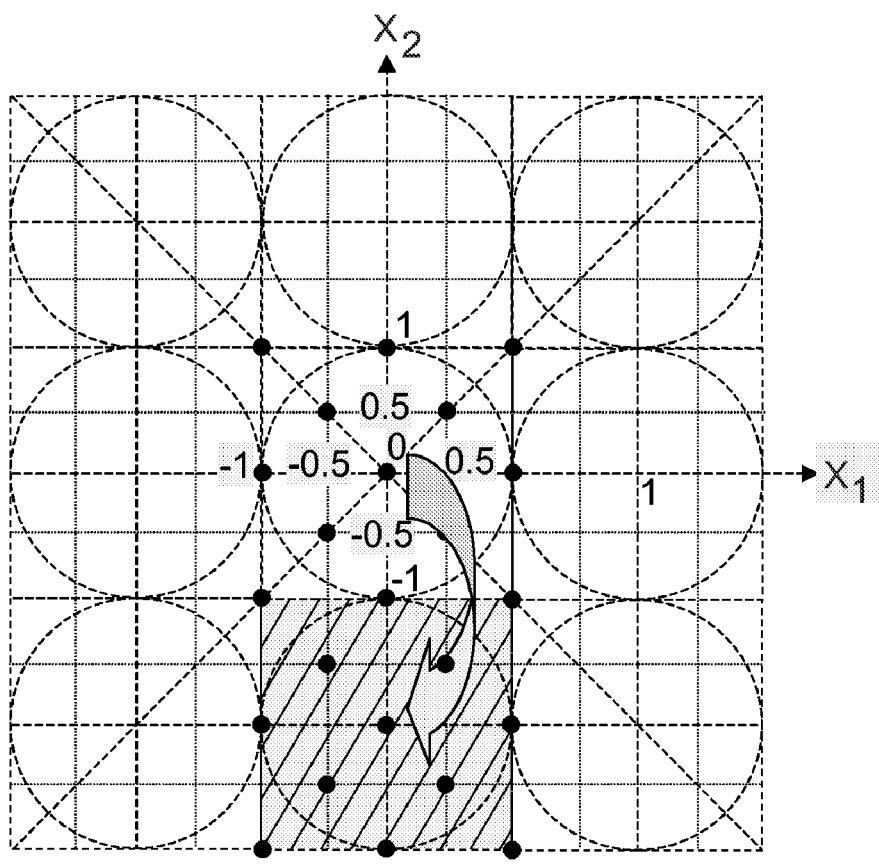
Figure 10:
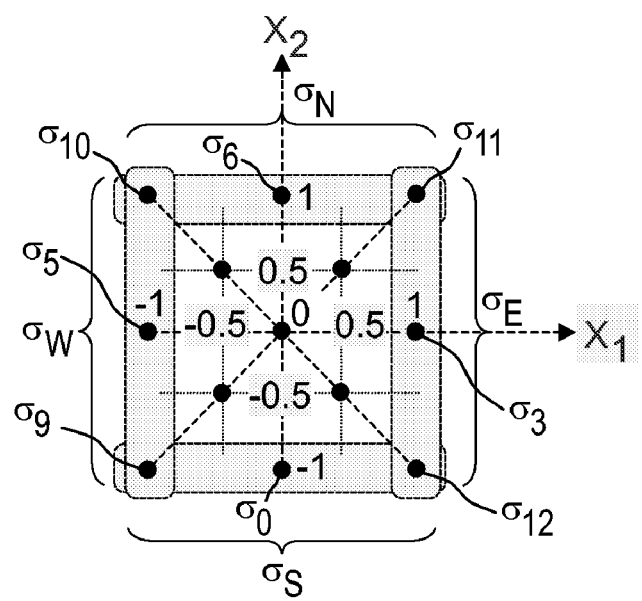
Figure 11:
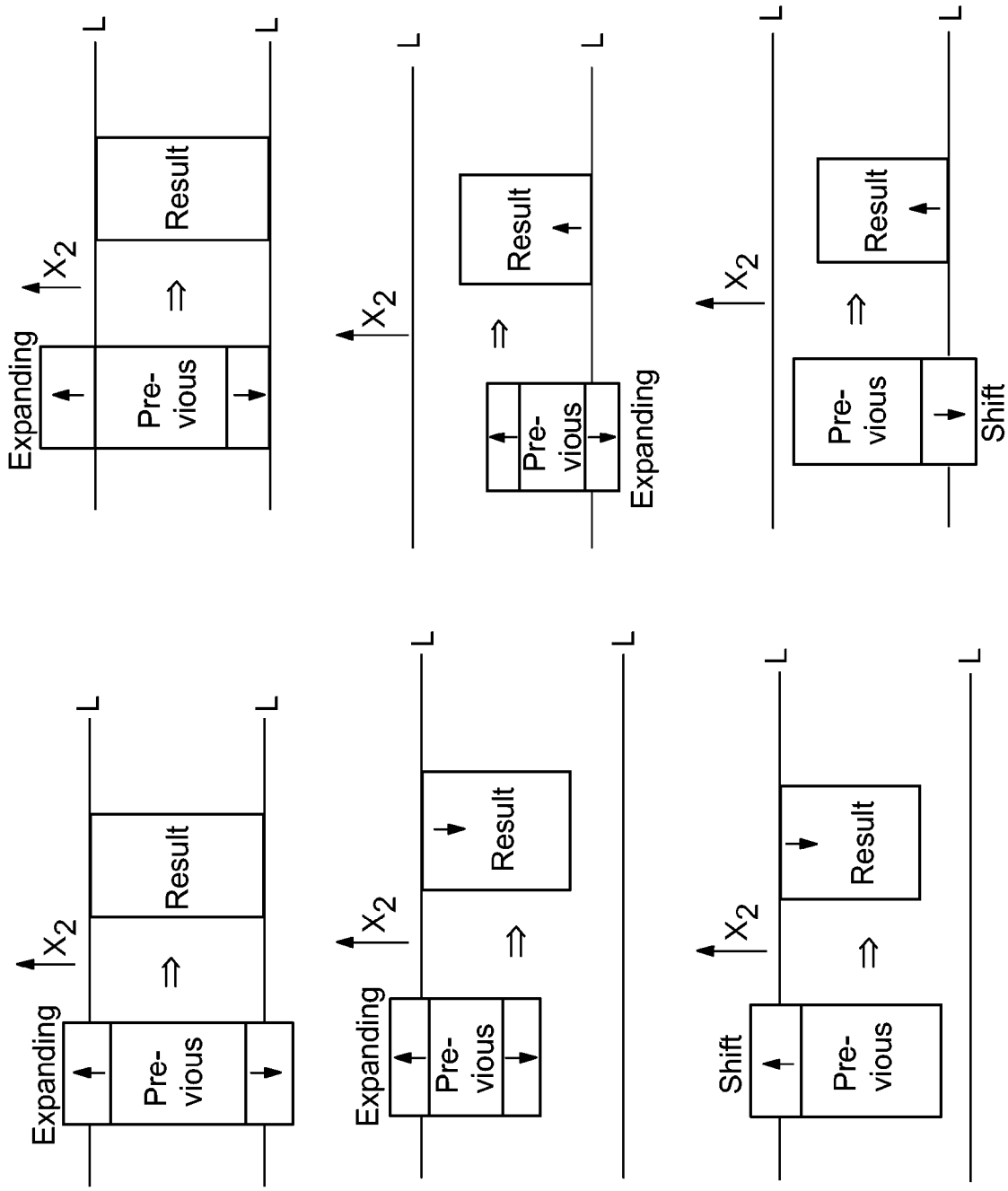
Figure 12:
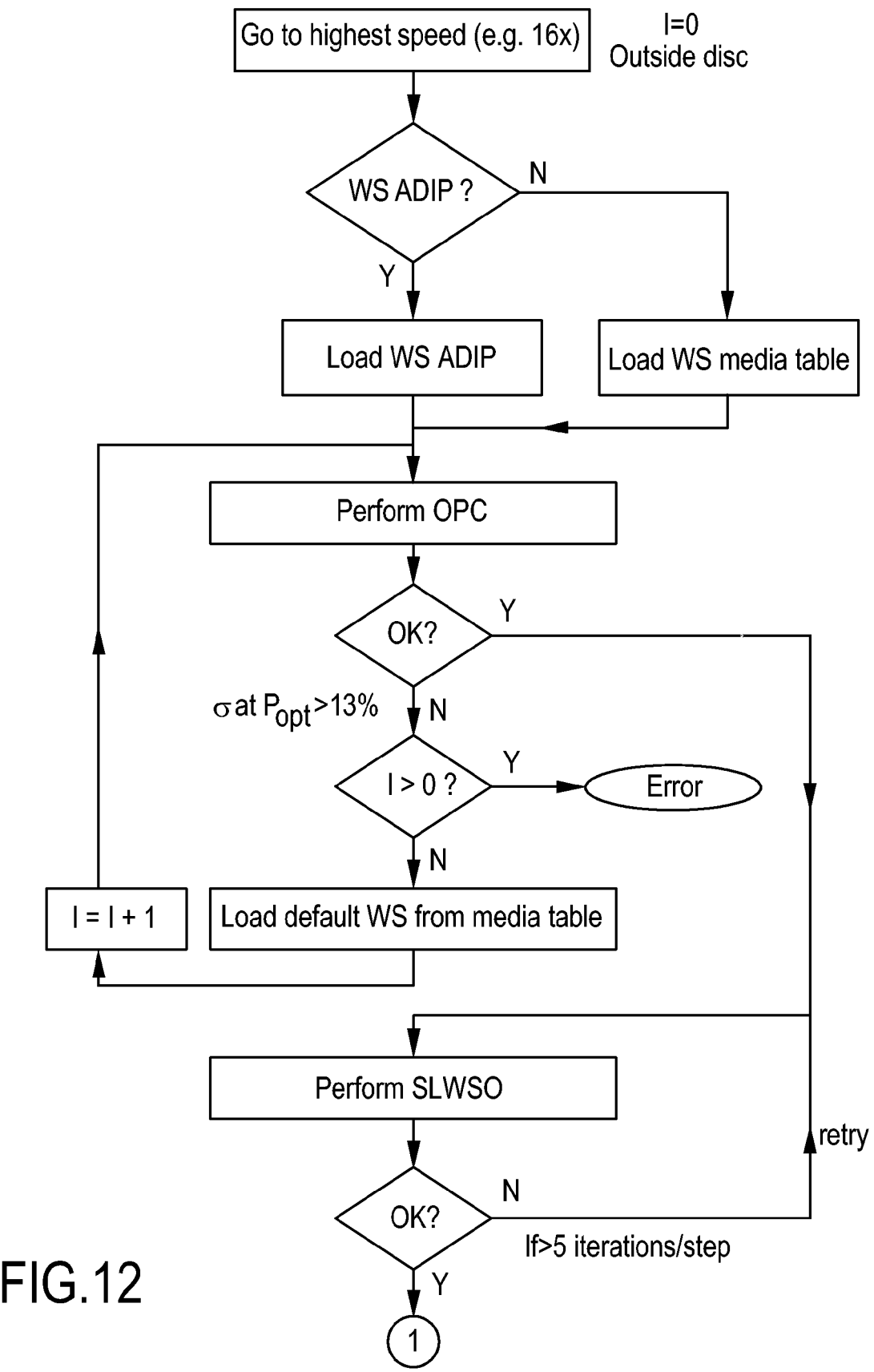
Figure 13:
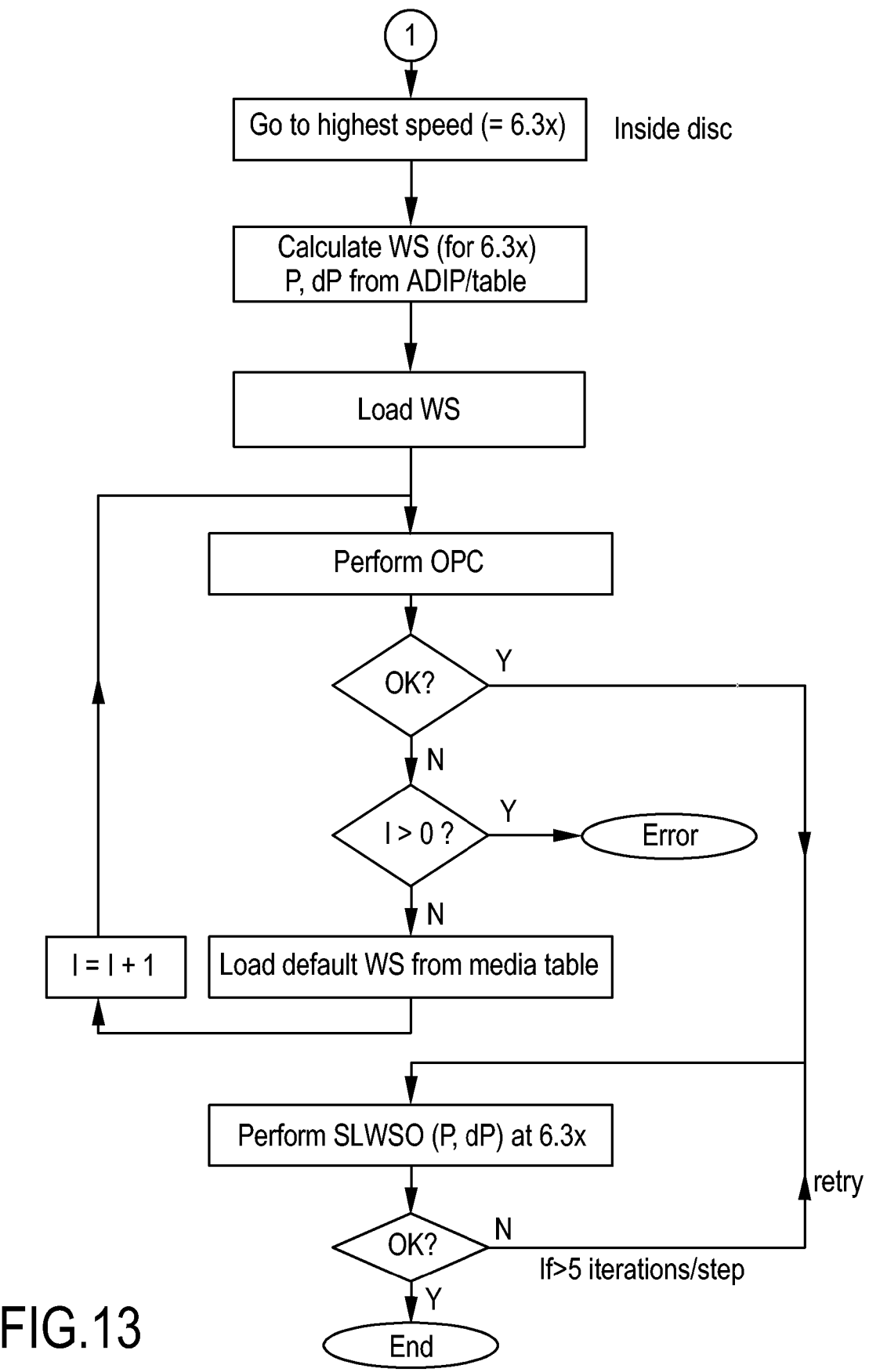
Figure 14:
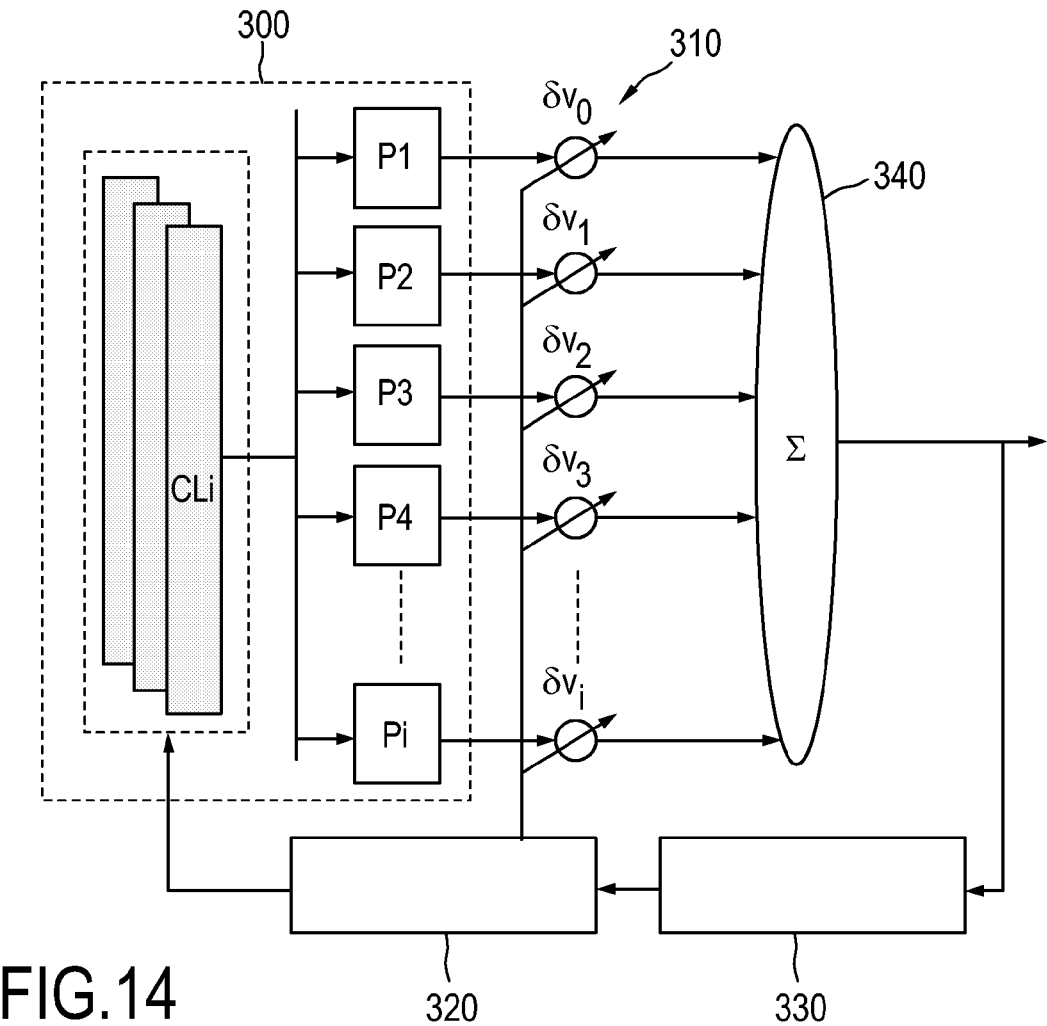
Figure 15:
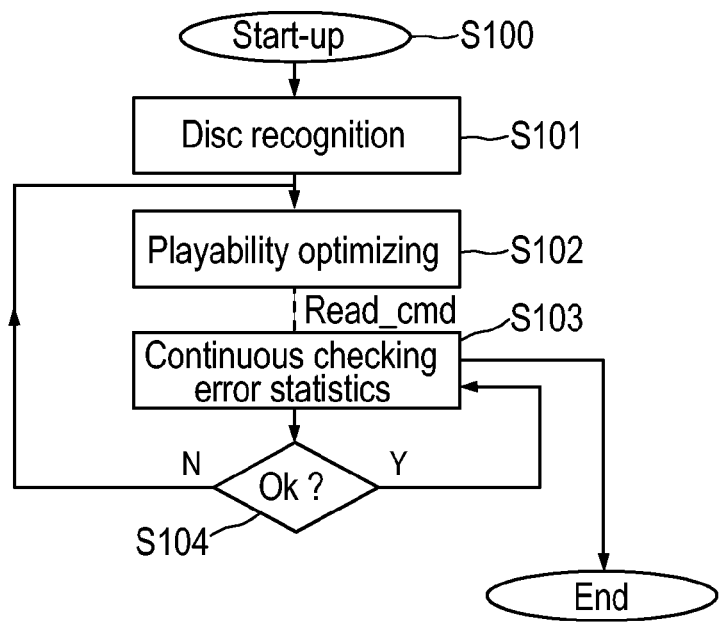
Figure 16:
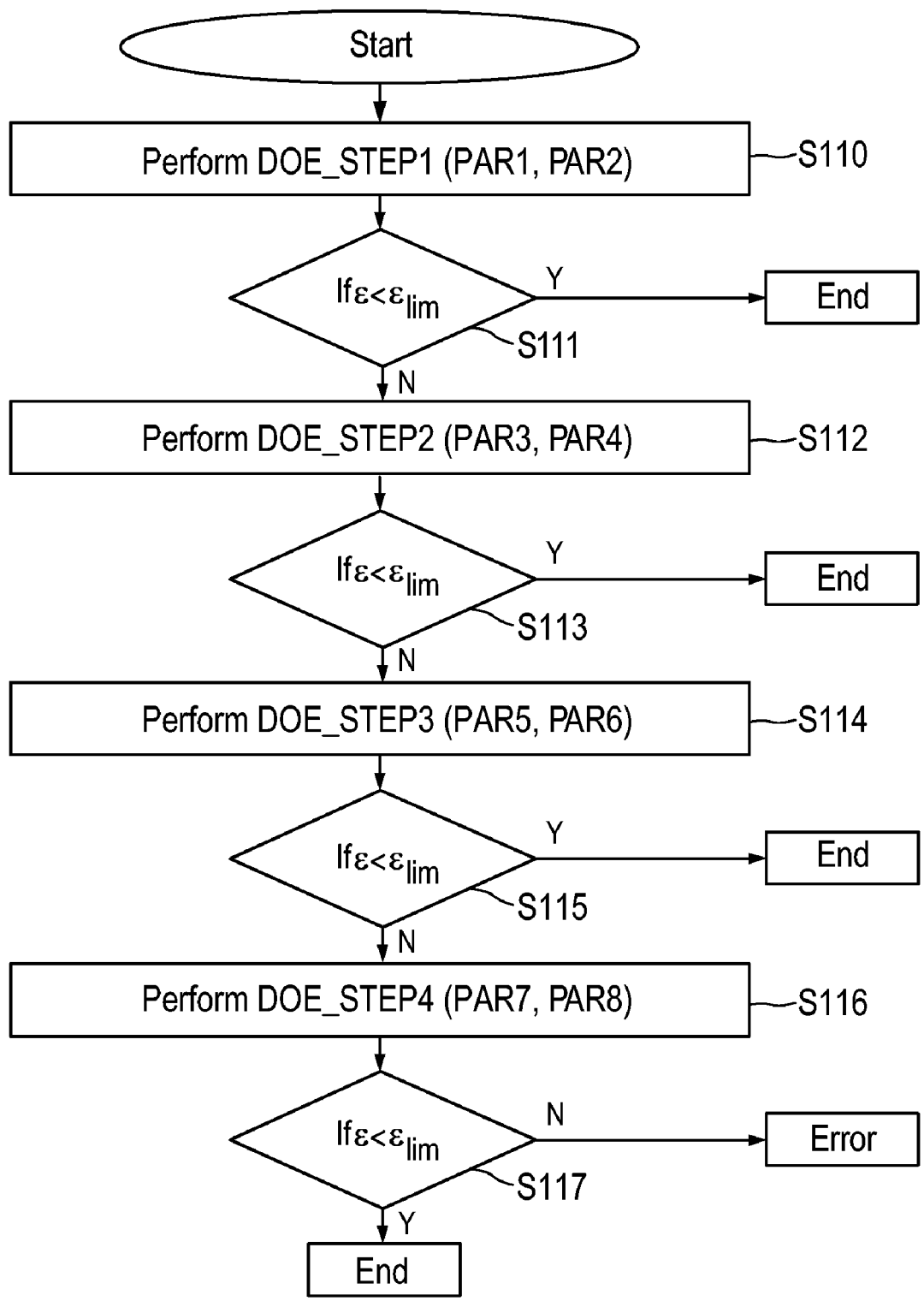
Figure 17:
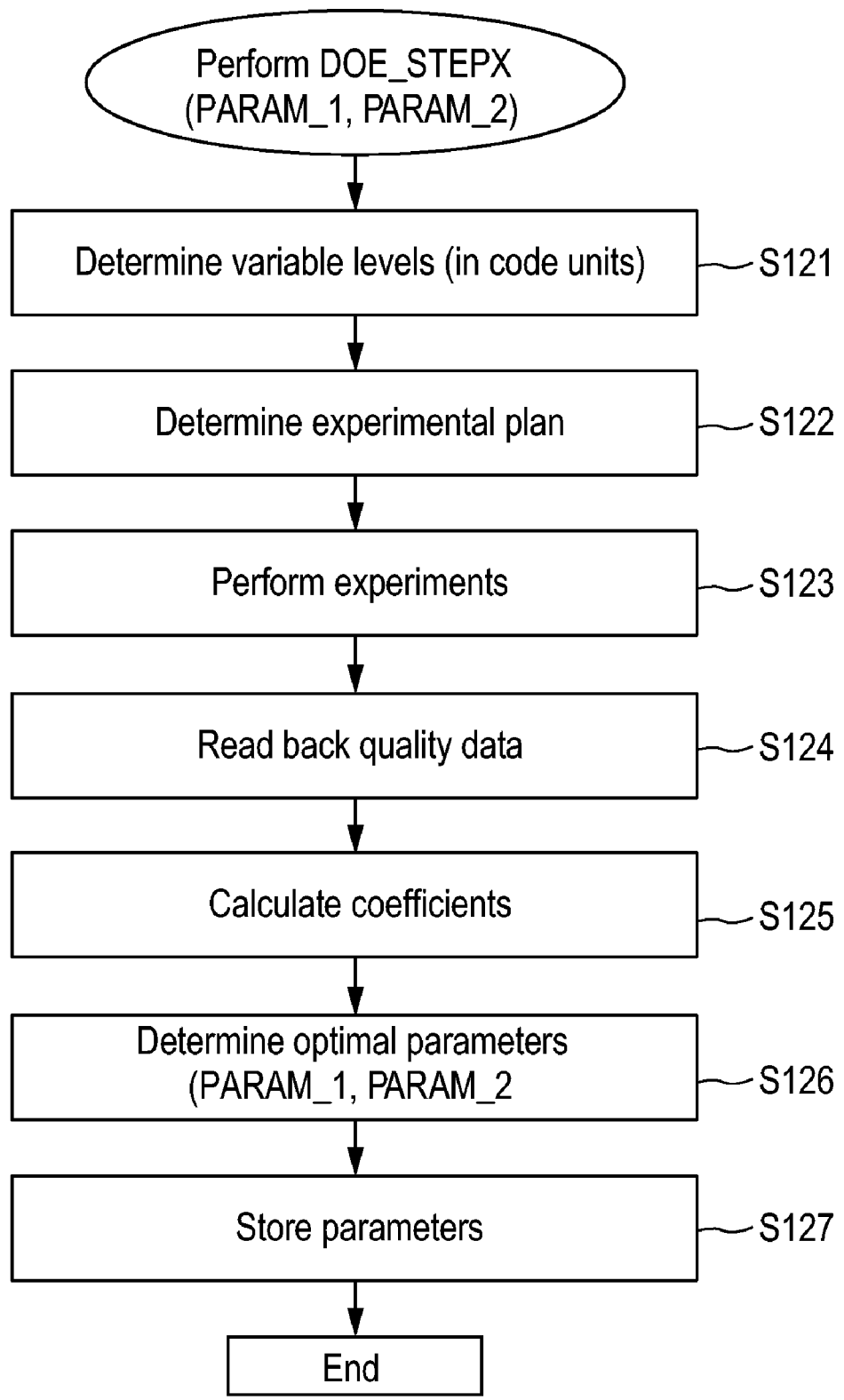
Figure 18:
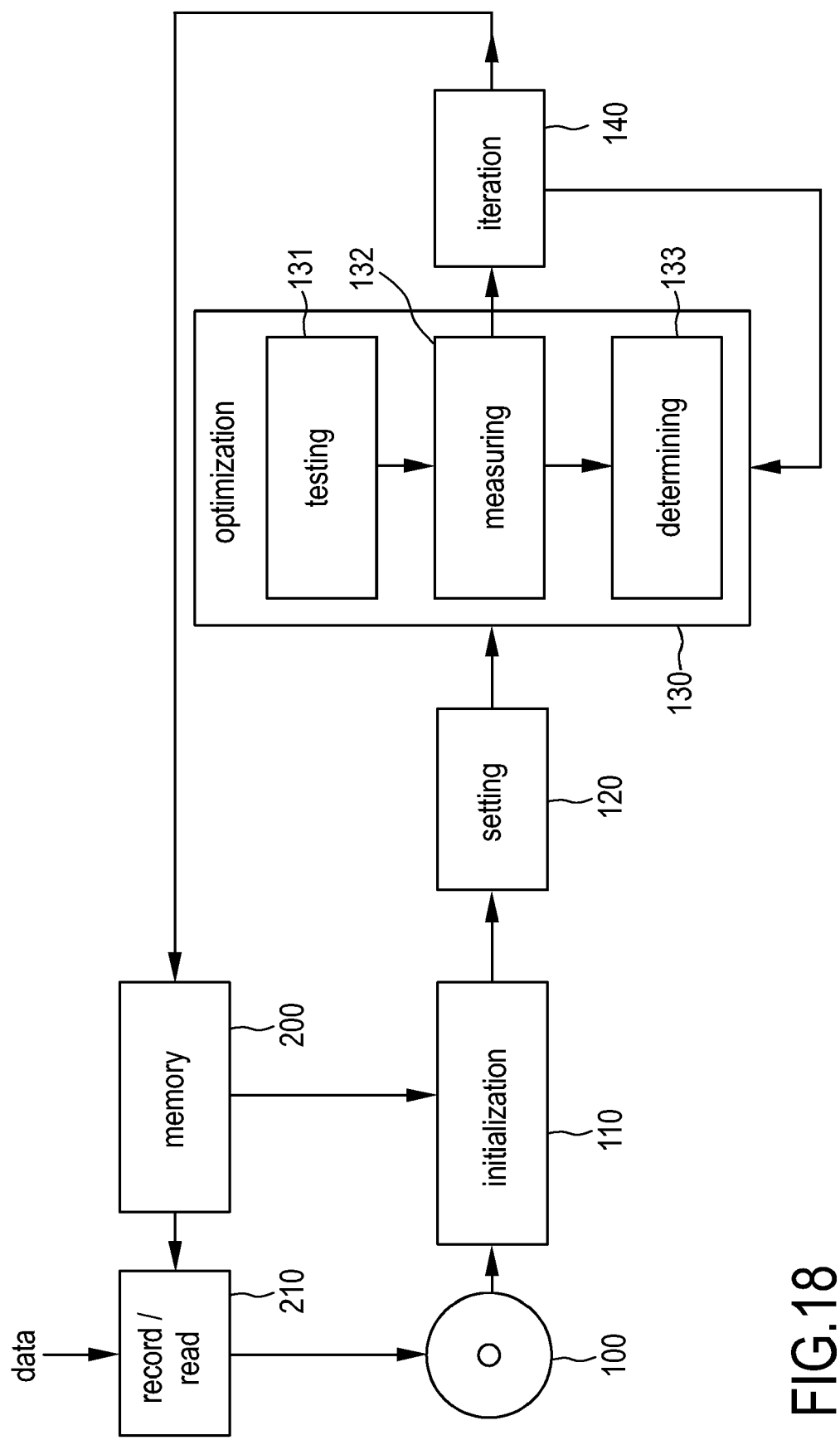

The invention will now be explained in more detail with reference to the drawings in which FIG. 1 shows a flow chart of the general method for determining write strategy parameters including the method according to the present invention, FIG. 2 shows the proposed optimization method for write strategy parameter optimization in more detail, FIG. 3 shows a diagram of the write strategy used for recording on a DVD+R disc, FIG. 4 shows a flow chart of the sub-steps of one optimization step in the write strategy parameter optimization, FIG. 5 shows a schematic diagram of two values $x_1$ and $x_2$ in a central composite design scheme, FIG. 6 shows a fitted model for two parameters as a function of jitter, FIG. 7 shows a flow chart illustrating the method according to the present invention in more detail, FIG. 8 shows a flow chart illustrating the step of determining the iteration direction, FIG. 9 shows schematic diagrams of the central composite design scheme of FIG. 5 illustrating different ways of modifying the variable levels, FIG. 10 shows a schematic diagram of the central composite design scheme of FIG. 5 indicating the obtained jitter values, FIG. 11 shows schematic diagrams illustrating example constraints of one parameter as a function of the boarder limits, FIG. 12 shows a flow chart of a practical embodiment for write strategy optimization method for high speed recording and FIG. 13 shows a flow chart of a practical embodiment of a write strategy optimization method for high and low speed recording, FIG. 14 shows a schematic diagram of an adaptive network for determining read or write parameters, FIG. 15 shows a flow chart illustrating an embodiment of a method for determining read parameters, FIG. 16 shows the proposed optimization method for read parameter optimization in more detail, FIG. 17 shows a flow chart of the sub-steps of one optimization step in the read parameter optimization method, and FIG. 18 shows a block diagram of a drive including an apparatus according to the present invention.

FIG. 1 shows a flow chart of a method for determining the write strategy parameter for recording data on a recordable or rewritable disc. It has been found that the laser power and the write strategy that should be used for recording on a disc is dependent on the disc, recorder and recording speed. For unknown discs, i.e. for discs (or, more accurate, for types of discs) for which there is no entry in a media table stored in the drive listing the optimal write strategy parameters, which are thus not optimized discs, these parameters will be determined for each recorder/disc combination at the actual recording speed. Such a determination of the write strategy parameters is can be activated by a certain command generated by the data-path, such a command being called "BE_Calibrate record" command S1 here.

Thus, after checking in step S2 if the disc is "unknown", a normal known OPC procedure in step S3 will be performed in case the disc is not unknown in order to determine the optimum write power $P_{opt}$ for recording on that disc.

In case the disc is "unknown", a normal known OPC procedure in step S4 is also performed using a default write strategy (e.g. read from the disc) in order to determine the indicative power $P_{ind}$, i.e. the starting write power user for the subsequent optimization method (SLWSO) in step S5 by which the optimized write strategy parameters are determined. Thus the unknown disc is translated into a well-known disc.

A flow chart of the proposed optimization method of step 5 is shown in FIG. 2. The SLWSO method is preferably executed at the Inner/Outer Disc Test Zone and is written from outside to inside disc direction. Parameters (or experiments) are preferably changed on the fly at every disc revolution transition. At each parameter step (or experiment) jitter will be measured during one revolution (e.g. 5 times during one ADIP frame for DVD+R) and will be averaged. The recording process, for instance on DVD+R media, is very sensitive to the variation of many parameters, like the recording power, ambient temperature, laser wavelength, etc. In order to improve the determination of the optimal laser power/timing, a calibration routine based on jitter measurement is preferred. Principally jitter read-out measurement should take place along one disc revolution to average out variations along the circumference like eccentricity, etc.

The most important DVD+R castle write strategy parameters that can be used in a write strategy optimizer are P (=Pw+dPw), Ti3 and dPw, which are all shown in the diagram of FIG. 3 schematically illustrating the general layout of a write pulse for DVD+R media at 6× and 8× (until 16×) recording speed. With these parameters experiments will be done in two different steps S51 and S53 (see FIG. 2). After each of said steps the write performance will be checked by reading the jitter value σ in steps S52 and S54. If the measured jitter σ is already below a certain limit $\sigma_{lim}$, which can be found from experiments and set in the drive (e.g. a limit of 10%) and with which written data can be read back on a reference DVD player, after the first or second step S51 or S53 no further experiments will be done.

Two extra steps S56 and S57 will be done if the jitter is too high after the first two steps in a sequence dependent on the level of dPw checked in step S55. Normally these extra parameters (Tlp4, dTle, Ttop and Tlp) are only needed as a fine adjustment of the write strategy. Finally, the jitter σ is again measured and checked against the limit $\sigma_{lim}$ in step S58. If it is still above an error is assumed, otherwise the optimization method is ended.

The definition of the write strategy parameters can be found in the DVD+R standard (DVD+R 4.7 Gbytes Basic Format Specifications, version 1.2, System Description, July 2003). FIG. 3 shows the parameters of the castle write strategy, which is described in the above cited article of G. Langereis and which is preferably used to program the write strategy registers of the front-end ICs in the drive. In subsequent table 1 byte numbers and a short description of the different write strategy parameters as used in the disc ADIP info are given:

| Byte number | Description | Symbol |
|---|---|---|
| 98 | Primary recording velocity for the parameter set in this EI block | $V_p$ |
| 99 | Upper recording velocity for the parameter set in this EI block | $V_u$ |
| 101 | PIND at Primary velocity | $Pind_p$ |
| 102 | Beta target at Primary velocity | $B_p$ |
| 103 | dPw power enhancement at Primary velocity | $dPw_p$ |
| 104 | Ti3 write pulse duration for 3T marks at Primary velocity | $Ti3_p$ |
| 105 | Ttop duration of power enhancement at Primary velocity | $Ttop_p$ |
| 106 | Tlp (>5) duration of power enhancement for cm > 5 at Primary velocity | $Tlp_p$ |
| 107 | Tlp (=4) duration of power enhancement for cm = 4 at Primary velocity | $Tlp4_p$ |
| 108 | dTle write pulse leading edge correction for ps = 3 at Primary velocity | $dTle_p$ |
| 109 | TC end of cooling gap at Primary velocity | $Tc_p$ |
| 115 | PIND at Upper velocity | $Pind_u$ |

-continued

| Byte number | Description | Symbol |
|---|---|---|
| 116 | Beta target at Upper velocity | $B_u$ |
| 117 | dPw power enhancement at Upper velocity | $dPw_u$ |
| 118 | Ti3 write pulse duration for 3T marks at Upper velocity | $Ti3_u$ |
| 119 | Ttop duration of power enhancement at Upper velocity | $Ttop_u$ |
| 120 | Tlp (>5) duration of power enhancement for cm > 5 at Upper velocity | $Tlp_u$ |
| 121 | Tlp (=4) duration of power enhancement for cm = 4 at Upper velocity | $Tlp4_u$ |
| 122 | dTle write pulse leading edge correction for ps = 3 at Upper velocity | $dTle_u$ |
| 123 | TC end of cooling gap at Upper velocity | $Tc_u$ |
| 127 | Pupper/Pprimary ratio | Mp |

The procedure of one SLWSO step S51, S53, S56, S57 shown in FIG. 2 is illustrated in more detail in the flow chart of FIG. 4. In a first step S61 the variable levels are determined. To increase resolution more experiments can be taken. In the preferred embodiment further explained here, 13 experiments based on code '0.5' and α=1 are taken, meaning a normalization of the parameters ("1" means that the total range is used; "0.5" means that half of the range is used). However, generally 9+4·n experiments, where n=0, 1, 2, . . . , for instance 9 experiments, can be taken as well. 13 experiments proposed here have in all directions the same number of experiments which will significantly increase the resolution and accuracy compared to 9 experiments without increasing the time required for performing the optimization method too much. The following table 2 shows the preferred variable levels in this embodiment:

| | Code unit | | | | |
|---|---|---|---|---|---|
| Parameter | −1 | −0.5 | 0 | +0.5 | +1 |
| PARAM_1 | PARAM_10 | PARAM_11 | PARAM_12 | PARAM_13 | PARAM_14 |
| PARAM_2 | PARAM_20 | PARAM_21 | PARAM_22 | PARAM_23 | PARAM_24 |

The proposed experimental plan determined therefrom in S62 is shown in the following table 3:

| Experiment | x1 | x2 | PARAM_1 | PARAM_2 | Measured jitter σ (av) |
|---|---|---|---|---|---|
| Exp 0 | 0 | −1 | PARAM_12 | PARAM_20 | $\sigma_0$ |
| Exp 1 | 0 | 0 | PARAM_12 | PARAM_22 | $\sigma_1$ |
| Exp 2 | −0.5 | +0.5 | PARAM_11 | PARAM_23 | $\sigma_2$ |
| Exp 3 | 1 | 0 | PARAM_14 | PARAM_22 | $\sigma_3$ |
| Exp 4 | +0.5 | −0.5 | PARAM_13 | PARAM_21 | $\sigma_4$ |
| Exp 5 | −1 | 0 | PARAM_10 | PARAM_22 | $\sigma_5$ |
| Exp 6 | 0 | +1 | PARAM_12 | PARAM_24 | $\sigma_6$ |
| Exp 7 | −0.5 | −0.5 | PARAM_11 | PARAM_21 | $\sigma_7$ |
| Exp 8 | +0.5 | +0.5 | PARAM_13 | PARAM_23 | $\sigma_8$ |
| Exp 9 | −1 | −1 | PARAM_10 | PARAM_20 | $\sigma_9$ |
| Exp 10 | −1 | +1 | PARAM_10 | PARAM_24 | $\sigma_{10}$ |
| Exp 11 | +1 | +1 | PARAM_14 | PARAM_24 | $\sigma_{11}$ |
| Exp 12 | +1 | −1 | PARAM_14 | PARAM_20 | $\sigma_{12}$ |

To calculate optimal parameters a statistical tool, in particular a response surface methodology, is used as described in the above cited article of G. Langereis. This tool is a collection of mathematical and statistical techniques for empirical model building. The objective is to optimize a response (output variable, e.g. jitter), which is influenced by two independent variables (input variables, e.g. P and Ti3). A series of tests, so-called experiments, are made in which changes are made in the input variables in order to identify the reasons for changes in the output response.

For most of the response surfaces, the functions for the approximations are polynomials because of simplicity. For the cases of quadratic polynomials, the response surface is described as follow (eq. 1):

$$y = \beta_0 + \sum_{j=1}^{k} \beta_j \cdot x_j + \sum_{j=1}^{k} \beta_{jj} \cdot x_j^2 + \sum_{i=1}^{k-1} \sum_{j=i+1}^{k} \beta_{ij} \cdot x_i \cdot x_j \quad (1)$$

A design of experiments (DOE) method is applied to reduce the variant of each coefficient in the approximated responses. For practical DOE of quality engineering central composite designs (CCD) are usually adopted. These designs are widely used in practice because they are relatively efficient with respect to the number of experiments required. In general, an extended CCD in k factors requires $2^k$ factorial and 2k axial experiments and at least one center point and 4 corner points. This is shown in FIG. 5 for k=2 illustrating a CCD method with 13 experiments.

In case of being relatively close to the optimum, a second order model is usually required approximating the response because of curvature in the true response surface. The fitted second order model is defined as follows (eq. 2):

$$\hat{y}=b_0+b_1 \cdot x_1+b_2 \cdot x_2+b_3 \cdot x_1 \cdot x_2+b_4 \cdot x_1^2+b_5 \cdot x_2^2 \quad (2)$$

Now, in step S63, N experiments are written on the disc using the experimental plan, i.e. the parameters (or experiments) are changed on the fly at every disc revolution transition and test data are written on the disc. At each parameter step (or experiment) jitter σ is measured in step S64, e.g. 5 times during one ADIP frame, and an average jitter $\sigma_x$ is preferably calculated. To find the model, all the model coefficients 'b' are estimated in step S65 based on jitter measurements ($\sigma_0$-$\sigma_{12}$) of the 13 experiments using the above mentioned CCD method. This can be expressed mathematically as follows:

$$x := \begin{pmatrix} 1 & x_1 & x_2 & x_1*x_2 & x_1^2 & x_2^2 \\ 1 & 0 & -1 & 0 & 0 & 1 \\ 1 & 0 & 0 & 0 & 0 & 0 \\ 1 & -.5 & .5 & -.25 & .25 & .25 \\ 1 & 1 & 0 & 0 & 1 & 0 \\ 1 & .5 & -.5 & -.25 & .25 & .25 \\ 1 & -1 & 0 & 0 & 1 & 0 \\ 1 & 0 & 1 & 0 & 0 & 1 \\ 1 & -.5 & -.5 & .25 & .25 & .25 \\ 1 & .5 & .5 & .25 & .25 & .25 \\ 1 & -1 & -1 & 1 & 1 & 1 \\ 1 & -1 & 1 & -1 & 1 & 1 \\ 1 & 1 & 1 & 1 & 1 & 1 \\ 1 & 1 & -1 & -1 & 1 & 1 \end{pmatrix} \quad y = \text{jitter} = \begin{pmatrix} \sigma_0 \\ \sigma_1 \\ \sigma_2 \\ \sigma_3 \\ \sigma_4 \\ \sigma_5 \\ \sigma_6 \\ \sigma_7 \\ \sigma_8 \\ \sigma_9 \\ \sigma_{10} \\ \sigma_{11} \\ \sigma_{12} \end{pmatrix}$$

$$xt := (x^T \cdot x)^{-1}$$

$$xt = \begin{pmatrix} 0.273 & 0 & 0 & 0 & -0.182 & -0.182 \\ 0 & 0.143 & 0 & 0 & 0 & 0 \\ 0 & 0 & 0.143 & 0 & 0 & 0 \\ 0 & 0 & 0 & 0.235 & 0 & 0 \\ -0.182 & 0 & 0 & 0 & 0.419 & -0.081 \\ -0.182 & 0 & 0 & 0 & -0.081 & 0.419 \end{pmatrix}$$

|     | 0 | 1 | 2 | 3 | 4 | 5 | 6 | 7 | 8 | 9 | 10 | 11 | 12 |
|---|---|---|---|---|---|---|---|---|---|---|---|---|---|
| ct = 0 | 0.091 | 0.273 | 0.182 | 0.091 | 0.182 | 0.091 | 0.091 | 0.182 | 0.182 | -0.091 | -0.091 | -0.091 | -0.091 |
| 1 | 0 | 0 | -0.071 | 0.143 | 0.071 | -0.143 | 0 | -0.071 | 0.071 | -0.143 | -0.143 | 0.143 | 0.143 |
| 2 | -0.143 | 0 | 0.071 | 0 | -0.071 | 0 | 0.143 | -0.071 | 0.071 | -0.143 | 0.143 | 0.143 | -0.143 |
| 3 | 0 | 0 | -0.059 | 0 | -0.059 | 0 | 0 | 0.059 | 0.059 | 0.235 | -0.235 | 0.235 | -0.235 |
| 4 | -0.263 | -0.182 | -0.097 | 0.237 | -0.097 | 0.237 | -0.263 | -0.097 | -0.097 | 0.156 | 0.156 | 0.156 | 0.156 |
| 5 | 0.237 | -0.182 | -0.097 | -0.263 | -0.097 | -0.263 | 0.237 | -0.097 | -0.097 | 0.156 | 0.156 | 0.156 | 0.156 |

$$ct := xt \cdot x^T$$

The coefficients are thus determined as follows:

$$b_0 = \frac{(\sigma_0 + \sigma_3 + \sigma_5 + \sigma_6 - \sigma_9 - \sigma_{10} - \sigma_{11} - \sigma_{12}) + 2 \cdot (\sigma_2 + \sigma_4 + \sigma_7 + \sigma_8) + 3 \cdot \sigma_1}{11}$$

$$b_1 = \frac{-(\sigma_2 - \sigma_4 + \sigma_7 - \sigma_8) + 2 \cdot (\sigma_3 - \sigma_5 - \sigma_9 - \sigma_{10} + \sigma_{11} + \sigma_{12})}{14}$$

$$b_2 = \frac{(\sigma_2 + \sigma_8 - \sigma_4 - \sigma_7) - 2 \cdot (\sigma_0 - \sigma_6 + \sigma_9 - \sigma_{10} - \sigma_{11} + \sigma_{12})}{14}$$

$$b_3 = \frac{(\sigma_7 + \sigma_8 - \sigma_2 - \sigma_4) + 4 \cdot (\sigma_9 - \sigma_{10} + \sigma_{11} - \sigma_{12})}{17}$$

$$b_4 = -0.26299 \cdot (\sigma_0 + \sigma_6) - \frac{2}{11} \cdot \sigma_1 - 0.09740 \cdot (\sigma_2 + \sigma_4 + \sigma_7 + \sigma_8) + 0.15584 \cdot (\sigma_9 + \sigma_{10} + \sigma_{11} + \sigma_{12}) + 0.23701 \cdot (\sigma_3 + \sigma_5)$$

$$b_5 = -0.26299 \cdot (\sigma_3 + \sigma_5) - \frac{2}{11} \cdot \sigma_1 - 0.09740 \cdot (\sigma_2 + \sigma_4 + \sigma_7 + \sigma_8) + 0.15584 \cdot (\sigma_9 + \sigma_{10} + \sigma_{11} + \sigma_{12}) + 0.23701 \cdot (\sigma_0 + \sigma_6)$$

Using these coefficients the model is fitted using the following equation:

$$yfit(x1, x2) = b_0 + b_1 \cdot x_1 + b_2 \cdot x_2 + b_3 \cdot x_1 x_2 + b_4 \cdot x_1^2 + b_5 \cdot x_2^2 \quad (3)$$

FIG. 6 shows a two-dimensional plot, in particular a fitted curve, of PARAM_1 and PARAM_2 as a function of jitter.

Thereafter, in step S66, the optimal parameters are determined by determining a minimum of PARAM_1 and PARAM_2 of the fitted model (in coded units) by:

$$\text{PARAM\_1}_{opt} = \left[ \frac{-\left(b_5 \cdot b_1 + \left(\frac{-b_3}{2}\right) \cdot b_2\right)}{2 \cdot \left(b_4 \cdot b_5 - \left(\frac{b_3}{2}\right)^2\right)} \right]; \quad (4)$$

$$\text{PARAM\_2}_{opt} = \left[ \frac{-\left(b_4 \cdot b_2 + \left(\frac{-b_3}{2}\right) \cdot b_1\right)}{2 \cdot \left(b_4 \cdot b_5 - \left(\frac{b_3}{2}\right)^2\right)} \right]$$

The coded (normalized) optimal values must be translated to real parameter values by linear interpolation between two parameter values of above shown table 2 before they are stored in step S67.

If the measurement result of one of the parameters has no parabola shape an iteration process is proposed according to the present invention by shifting or expanding the initial measurement point to the opposite direction. A flow chart illustrating this method is shown in FIG. 7.

The first part of FIG. 7, i.e. step S71 corresponding to steps S61 and S62 as well as step S72 corresponding to steps S63 to S66, explains the design of experiments (DOE) algorithm (or more detailed a central composite design method) as described above and as shown in detail in FIG. 4. The second part of FIG. 7 following step S72 explains the iteration process. In the first part of the iteration process the iteration direction will be determined and in the second part the new variable levels and experimental plan will be defined. In FIG. 7 the parameter Q is used to indicate the number of steps.

The initial variable levels in coded form determined in step S71 can be taken from the following table 4:

| Parameter | Code unit | | | | |
|---|---|---|---|---|---|
| | -1 | -0.5 | 0 | +0.5 | +1 |
| $x_1$ | $xp1_{(-1)}$ | $xp1_{(-0.5)}$ | $xp1_{(0)}$ | $xp1_{(+0.5)}$ | $xp1_{(+1)}$ |
| $x_2$ | $xp2_{(-1)}$ | $xp2_{(-0.5)}$ | $xp2_{(0)}$ | $xp2_{(+0.5)}$ | $xp2_{(+1)}$ |

The initial experimental plan for step z determined in step S71 can be taken from the following table 5:

| Experiment | $x_1$ | $x_2$ | $xp_1$ | $xp_2$ | Measured jitter σ (av) |
|---|---|---|---|---|---|
| Exp 0 | 0 | −1 | $xp1_{(0)}$ | $xp2_{(-1)}$ | $\sigma_{0z}$ |
| Exp 1 | 0 | 0 | $xp1_{(0)}$ | $xp2_{(0)}$ | $\sigma_{1z}$ |
| Exp 2 | −0.5 | +0.5 | $xp1_{(-0.5)}$ | $xp2_{(+0.5)}$ | $\sigma_{2z}$ |
| Exp 3 | 1 | 0 | $xp1_{(+1)}$ | $xp2_{(0)}$ | $\sigma_{3z}$ |
| Exp 4 | +0.5 | −0.5 | $xp1_{(+0.5)}$ | $xp2_{(-0.5)}$ | $\sigma_{4z}$ |
| Exp 5 | −1 | 0 | $xp1_{(-1)}$ | $xp2_{(0)}$ | $\sigma_{5z}$ |
| Exp 6 | 0 | +1 | $xp1_{(0)}$ | $xp2_{(+1)}$ | $\sigma_{6z}$ |
| Exp 7 | −0.5 | −0.5 | $xp1_{(-0.5)}$ | $xp2_{(-0.5)}$ | $\sigma_{7z}$ |
| Exp 8 | +0.5 | +0.5 | $xp1_{(+0.5)}$ | $xp2_{(+0.5)}$ | $\sigma_{8z}$ |
| Exp 9 | −1 | −1 | $xp1_{(-1)}$ | $xp2_{(-1)}$ | $\sigma_{9z}$ |
| Exp 10 | −1 | +1 | $xp1_{(-1)}$ | $xp2_{(+1)}$ | $\sigma_{10z}$ |
| Exp 11 | +1 | +1 | $xp1_{(+1)}$ | $xp2_{(+1)}$ | $\sigma_{11z}$ |
| Exp 12 | +1 | −1 | $xp1_{(+1)}$ | $xp2_{(-1)}$ | $\sigma_{12z}$ |

The range in one direction can be determined by $$[\Delta xp1]_{prev} = [xp1_{(+1)}]_{prev} - [xp1_{(0)}]_{prev}$$

and $$[\Delta xp2]_{prev} = [xp2_{(+1)}]_{prev} - [xp2_{(0)}]_{prev}.$$

The determination of the iteration direction in step S90 (shown in more detail in FIG. 8) will be based on the $b_4$ and $b_5$ coefficients of equation (3). This means that the quadratic parts of the equation will be used to determine if an iteration process is necessary or not in step S73 Since a minimum of the model shall be found, these two coefficient $b_4$ and $b_5$ must have positive values.

If no iteration is required the parameters are calculated and stored (S74), the jitter is calculated according to equation 6 and stored (S75), and the write strategy is temporally stored (S76). In step S77 a check is made if already two runs have been made and if the jitter is larger than in the previous step, or it there is a time-out. If this is the case, it is checked (S78) if the jitter is below the limit. If this is the case the EEPROM table is updated with the optimized write strategy parameters (S79). Otherwise an error is issued.

If the check in step S77 gives a negative result the variables are reset before the start of a new run (S80). Further, the step counter Q is increased by one (S81), and it is checked (S82) if the jitter is too high in a sequence dependent on the level of dPw (compare step S55 of FIG. 2). In this case (S83) additional steps 3 and 4 (S56, S57 of FIG. 2) are carried out. Finally, after five retries (S84) an error will be issued.

If $b_4$ is negative an $x_1$ parameter direction change has to be done (or east/west direction), by increasing the $x_1$ range called "expanding" (see FIG. 9a). Therefore the average jitter at the west side will be compared with the average jitter at the east side. The same procedure will be used if $b_5$ is negative, but the iteration direction will be north/south (i.e. an $x_2$ parameter direction change; see FIG. 9b).

The same procedure, but in both directions, is also valid for $\Delta\sigma < 3\%$ ($\Delta\sigma = \sigma_{highest} - \sigma_{lowest}$, these are jitters from the different experiments). The same procedure will also be followed if the determinant is negative and both coefficients $b_4$ and $b_5$ are positive (see FIG. 9c). On the other hand, if the range is too large by $\Delta\sigma > 10\%$ (only if b4 and/or b5 and determinant <0), the range has to be decreased called "contracting" (see FIGS. 9d and 9e).

If the $b_4$ and $b_5$ coefficients are both positive and one or both calculated optimal parameters are outside the coded range [−1, +1], a parameter direction correction, called "shift", has also to be done because extrapolations shall not be tolerated (see FIG. 9f for a small $x_1$ shift in positive direction and FIG. 9g for an $x_2$ shift in negative direction). The iteration direction can be derived from the optimal parameter value $(x1)_{opt}$ and/or $(x2)_{opt}$ as shown in FIG. 8.

The range in one direction $\Delta xp1$ or $\Delta xp2$ will be the same for the new variable levels.

After increasing the iteration count I by one (S91) and checking (S92) if the iteration counter exceeds a give limit (here, for instance, five), the new variable levels are determined (S93). The variable values at code zero are $$[xp1_{(0)}]_{new} = [xp1_{(0)}]_{prev} + S1 \cdot [\Delta xp1]_{prev};$$

$$[xp2_{(0)}]_{new} = [xp2_{(0)}]_{prev} + S2 \cdot [\Delta xp2]_{prev}.$$

The rest of the variable levels can be calculated as follows:

$$[xp1_{(+1)}]_{new} = [xp1_{(+1)}]_{prev} + S1 \cdot [\Delta xp1]_{prev} + K1 \cdot \frac{[\Delta xp1]_{prev}}{2} - R1 \cdot \frac{[\Delta xp1]_{prev}}{\sqrt{2}}$$

$$[xp2_{(+1)}]_{new} = [xp2_{(+1)}]_{prev} + S2 \cdot [\Delta xp2]_{prev} + K2 \cdot \frac{[\Delta xp2]_{prev}}{2} - R2 \cdot \frac{[\Delta xp2]_{prev}}{\sqrt{2}};$$

Then it is checked if the new $x_1$ and $x_2$ parameters are within the limit ranges (border limits). If the $x_1$ and $x_2$ parameter are within range then $$[\Delta xp1]_{new} = [xp1_{(+1)}]_{new} - [xp1_{(0)}]_{new}$$

$$[\Delta xp2]_{new} = [xp2_{(+1)}]_{new} - [xp2_{(0)}]_{new}$$

$$[xp1_{(+0.5)}]_{new} = [xp1_{(0)}]_{new} + \frac{[\Delta xp1]_{new}}{2};$$

$$[xp2_{(+0.5)}]_{new} = [xp2_{(0)}]_{new} + \frac{[\Delta xp2]_{new}}{2}$$

$$[xp1_{(-0.5)}]_{new} = [xp1_{(0)}]_{new} - \frac{[\Delta xp1]_{new}}{2};$$

$$[xp2_{(-0.5)}]_{new} = [xp2_{(0)}]_{new} - \frac{[\Delta xp2]_{new}}{2}$$

$$[xp1_{(-1)}]_{new} = [xp1_{(0)}]_{new} - [\Delta xp1]_{new};$$

$$[xp2_{(-1)}]_{new} = [xp2_{(0)}]_{new} - [\Delta xp2]_{new}.$$

If the x1 and x1 parameters are not within range, some constraints as shown in FIG. 11 with respect to borders which are determined by experiments during development must be taken into account. FIG. 11 shows example constraints for the $x_2$ parameter as a function of the border limits.

The new coded variable levels are thus as shown in the following table 6:

| Parameter | Code unit | | | | |
|---|---|---|---|---|---|
| | −1 | −0.5 | 0 | +0.5 | +1 |
| $x_1$ | $[xp1_{(-1)}]_{new}$ | $[xp1_{(-0.5)}]_{new}$ | $[xp1_{(0)}]_{new}$ | $[xp1_{(+0.5)}]_{new}$ | $[xp1_{(+1)}]_{new}$ |
| $x_2$ | $[xp2_{(-1)}]_{new}$ | $[xp2_{(-0.5)}]_{new}$ | $[xp2_{(0)}]_{new}$ | $[xp2_{(+0.5)}]_{new}$ | $[xp2_{(+1)}]_{new}$ |

Finally the new experimental plan is determined in step S94 and it is returned to step S72. The new experimental plan is, as an example, shown in the following table 7:

| Experimental | $x_1$ | $x_2$ | $xp_1$ | $xp_2$ | Measured jitter σ (av) |
|---|---|---|---|---|---|
| Exp 0 | 0 | −1 | $[xp1_{(0)}]_{new}$ | $[xp2_{(-1)}]_{new}$ | $\sigma_{0z}$ |
| Exp 1 | 0 | 0 | $[xp1_{(0)}]_{new}$ | $[xp2_{(0)}]_{new}$ | $\sigma_{1z}$ |
| Exp 2 | −0.5 | +0.5 | $[xp1_{(-0.5)}]_{new}$ | $[xp2_{(0.5)}]_{new}$ | $\sigma_{2z}$ |
| Exp 3 | 1 | 0 | $[xp1_{(1)}]_{new}$ | $[xp2_{(0)}]_{new}$ | $\sigma_{3z}$ |
| Exp 4 | +0.5 | −0.5 | $[xp1_{(0.5)}]_{new}$ | $[xp2_{(-0.5)}]_{new}$ | $\sigma_{4z}$ |
| Exp 5 | −1 | 0 | $[xp1_{(-1)}]_{new}$ | $[xp2_{(0)}]_{new}$ | $\sigma_{5z}$ |
| Exp 6 | 0 | +1 | $[xp1_{(0)}]_{new}$ | $[xp2_{(1)}]_{new}$ | $\sigma_{6z}$ |
| Exp 7 | −0.5 | −0.5 | $[xp1_{(-0.5)}]_{new}$ | $[xp2_{(-0.5)}]_{new}$ | $\sigma_{7z}$ |
| Exp 8 | +0.5 | +0.5 | $[xp1_{(0.5)}]_{new}$ | $[xp2_{(0.5)}]_{new}$ | $\sigma_{8z}$ |
| Exp 9 | −1 | −1 | $[xp1_{(-1)}]_{new}$ | $[xp2_{(-1)}]_{new}$ | $\sigma_{9z}$ |
| Exp 10 | −1 | +1 | $[xp1_{(-1)}]_{new}$ | $[xp2_{(1)}]_{new}$ | $\sigma_{10z}$ |
| Exp 11 | +1 | +1 | $[xp1_{(1)}]_{new}$ | $[xp2_{(1)}]_{new}$ | $\sigma_{11z}$ |
| Exp 12 | +1 | −1 | $[xp1_{(1)}]_{new}$ | $[xp2_{(-1)}]_{new}$ | $\sigma_{12z}$ |

Once the optimized write strategy is determined it can be stored in the drive. Thus the unknown disc is translated into a well-known disc.

The method according to the invention can be implemented as follows. For low speeds (≦6×DVD±R) other parameters and parameter ranges will be chosen. SLWSO will be performed completely (max 4 steps) on the test zone at the inside of the disc.

For high speed (>6×) DVD±R writing the following algorithm can be taken into account (see FIGS. 12 and 13). SLWSO will be performed completely at the highest speed on the test zone at the outside of the disc. The power/timing parameters of the castle write strategy will be determined by the highest recording speed (e.g. 16×) for that disc. The values of the timing parameters will also be used for the lowest speed (6.3×, inside of the disc). The power parameters of the castle write strategy will be determined by both the highest as the lowest speed. For the intermediate speeds a linear interpolation of the power parameters will be made between both highest/lowest speeds. A retry of the SLWSO will be performed if the number iterations per step will be exceeding the value of five.

In the above an embodiment of the invention for determining optimized write strategy parameters for recording data on an optical record carrier has been explained. The invention can, in a similar way, also be used for determining read parameters for reproducing data from an optical record carrier. An embodiment illustrating this use of the invention will be explained in the following.

FIG. 14 shows a schematic diagram of an embodiment of an adaptive network where different parameters with respect to playability will be adjusted by adjustment means 310 until optimal playability of the optical drive is reached. Initial settings from development phase will be loaded during the start-up phase of a disc as start values at the input 300 (Pi). It is preferred to split-up the settings in different classes CLi to handle different environments like disc defects, shock behavior or a combination of both. After loading the initial settings error statistics will be measured in error measurement units.

Supposed, data errors occur during reading of a disc and recovery is needed. The read process will be stopped to start read recovery procedure. Read recovery could be possible by changing of parameters by the adjustment means 310. Then, the same data will be read and error statistics will be measured and a second order model will be made to find an optimum. Iterations could be needed to find the optimum value of the parameters by the search unit 320. Depending on the result obtained at the output 340 another class of settings will be switched on in a subsequent iteration until an optimum is found.

FIG. 15 shows a simple flow chart of a method for determining the read parameter for reading data from a disc according to the present invention. During the start-up phase S100 of the disc playability tests are done as a part of the start-up (mounting) procedure of the disc. Tests are done at different positions on the disc. Then playability is tested (S101) at the actual disc in the actual environment of the drive. Because this is a part of start-up no memory for data linking is necessary.

During read of the disc, i.e. after reading data from the disc with initial settings of the start-up (read_cmd), error statistics are measured (S103). Depending on the results (S104) parameter changes can be made on the fly (S102) to create always the highest system margin, i.e. dynamic optimizing is applied. If read errors occur playability optimizing (S102) can be activated by stopping the read process. After the optimizing the read process can be started again.

During development different settings are analyzed and stored, for instance in one or more tables, preferably for different environments. The optimization is done in a certain test environment with one or more certain test disc(s) having different defects like scratches, black dots, fingerprints, etc. of different size. To improve playability, the parameters (PAR) are changed during the experiments as shown in the flow chart of FIG. 16 from step to step (S110, S112, S114, S116). To limit the calculation load a choice is made in this embodiment to change only two parameters per step. It should be remarked that also the scheme shown in FIG. 2 could—in principle—be used for read parameter optimization.

First (S110), the most important parameters PAR1, PAR2 are chosen with respect to playability, e.g. servo parameters like radial, focus bandwidths, decoder parameters like equalizer, slicer, PLL bandwidth, etc. After each experimental step (S110, S112, S114, S116) it is checked (S111, S113, S115, S117) error statistics ε are measured and it is checked whether a predetermined limit $\epsilon_{lim}$ for said error statistics has been exceeded. If not the next experimental step is carried out; otherwise the optimization procedure is stopped.

Assuming a DVD, in the hardware there are two counters (BLER counters), which count the number of rows/columns (PI/PO) with at least one error. These are the normal used counters. But the hardware has also counters available that count the number of rows/columns with one error, 2 errors, 3 errors, etc. and this for PI/PO corrections. There are also counters that count the number of uncorrectable errors. This means that some extra information is available for judging the quality of data. Thus, error statistics can be built-up to make a better decision if, for instance, some improvements are seen with the actual used parameters compared with the previous one.

The procedure of one step S110, S112, S114, 116 shown in FIG. 16 is illustrated in more detail in the flow chart of FIG. 17 which is essentially identical to the flow chart shown in FIG. 4. In a first step S121 the variable levels are determined. To increase resolution more experiments can be taken. In the preferred embodiment further explained here, 13 experiments based on code '0.5' and α=1 are taken, these codes having the same meaning as explained above with reference to FIG. 4. Table 2 shown above illustrates the preferred variable levels in this embodiment. The proposed experimental plan determined therefrom in step S122 is shown in above table 3 (where, however, "error statistics $\epsilon$" are determined here instead of "measured jitter $\sigma$").

To calculate optimal parameters a statistical tool, in particular a response surface methodology, is used as described above with reference to FIG. 5 and equations (1) and (2).

Now, in step S123, N experiments are performed using the experimental plan, i.e. the parameters (or experiments) are changed on the fly at every disc revolution transition and test data are read from the disc. At each parameter step (or experiment) error statistics (or, more generally, quality data) are measured in step S124, and an average for the quality data is preferably calculated. To find the model, all the model coefficients 'b' are estimated in step S125 based on error statistics measurements ($\epsilon_0$-$\epsilon_{12}$) of the 13 experiments using the above mentioned CCD method (see also equation (3) and FIG. 6).

Thereafter, in step S126, the optimal parameters are determined by determining a minimum of PARAM_1 and PARAM_2 of the fitted model (in coded units) by the above equation (4). The coded (normalized) optimal values must be translated to real parameter values by linear interpolation between two parameter values of above shown table 2 before they are stored in step S127.

If the measurement result of one of the parameters has no parabola shape an iteration process (e.g. as shown in FIG. 14) is used in which the initial measurement point is shifted/expanded to another direction depending on the model result. This is done in the same way as it has been explained above for the first embodiment of the invention.

FIG. 18 shows a schematic block diagram of a drive for accessing an optical record carrier 100 including an apparatus for determining write strategy parameters and/or read in accordance with the present invention. Said apparatus includes, as explained above, initialization means 110 for setting initial write strategy parameters/initial read parameters, for instance taken from a memory 200, e.g. coefficient table (read), a media table of the drive, or taken directly from the disc 100. Further, the apparatus comprises setting means 120 for setting initial variable levels and an initial experimental plan, based on variations of said initial write strategy parameters/initial read parameters, for use in a design of experiments method for optimization of said write strategy parameters/read parameters. These initial variable levels and the initial experimental plan are used by optimization means 130 for determining optimized (write strategy/read) parameters by use of a design of experiments method. The optimization means 130 are therefore provided with testing means 131 for performing a number of test recordings/test readings on the record carrier 100 in accordance with the experimental plan, measurement means 132 for measuring a quality parameter value of a quality parameter (e.g. jitter for write strategy parameter optimization, error statistics for read parameter optimization) for each test recording/test reading indicating the recording quality/reproduction quality of the test recording/test reading and determination means 133 for determining optimized (write strategy/read) parameters by evaluation of the measured quality parameter values for said test recordings/test readings. Still further, iteration means 140 are provided for checking if, based on a predetermined criterion, the optimized (write strategy/read) parameters determined by the optimization means 130 shall be further optimized and, in this case, for determining new variable levels and a new experimental plan for use in another iteration for further optimization of the write strategy parameters/read parameters.

If the final optimized (write strategy/read) parameters have been found they can be stored in the drive, for instance in the memory 200 for further use by the recording/reading means 210 of the drive for recording the data on the record carrier 100 and/or reading data from the record carrier 100.

In the above the present invention has been explained by use of particular embodiments. It is clear that the above embodiments do not limit the scope of protection, but that many modifications and alternatives to the features of these particular embodiments can be made. In particular, the number of experiments, the parameters used in the experiments, the model used for the optimization, the criteria used for any decisions in the method are the means for implementing the method can be modified compared to these embodiments.

The invention claimed is:

1. Apparatus for determining write strategy parameters for recording data on an optical record carrier, comprising:
   initialization means for setting initial write strategy parameters,
   setting means for setting initial variable levels and an initial experimental plan, based on variations of said initial write strategy parameters, for use in a design of experiments method for optimization of said write strategy parameters,
   optimization means for determining optimized write strategy parameters by use of a design of experiments method, and
   iteration means for checking if, based on a predetermined criterion, the optimized write strategy parameters determined by the optimization means shall be further optimized and, in case the write strategy parameters shall be further optimized, for determining new variable levels and a new experimental plan for use in another iteration of the design of experiments method for further optimization of said write strategy parameters, wherein said predetermined criterion comprises coefficient values of quadratic terms of a second-order model used for determining the optimized write strategy parameters by said optimization means.

2. Apparatus as claimed in claim 1,
   wherein said optimization means comprise:
   test recording means for performing test recordings on said record carrier a predetermined number of times using variations of said initial write strategy parameters as set in the variable levels and the experimental plan used by the design of experiments method,
   measurement means for measuring a quality parameter value of a quality parameter for each test recording indicating the recording quality of said test recording, and
   determination means for determining optimized write strategy parameters by evaluation of the measured quality parameter values for said test recordings.

3. Apparatus for determining read parameters for reproducing data from an optical record carrier, comprising:
- initialization means for setting initial read parameters,
- setting means for setting initial variable levels and an initial experimental plan, based on variations of said initial read parameters, for use in a design of experiments method for optimization of said read parameters,
- optimization means for determining optimized read parameters by use of a design of experiments method, and
- iteration means for checking if, based on a predetermined criterion, the optimized read parameters determined by the optimization means shall be further optimized and, in case the read parameters shall be further optimized, for determining new variable levels and a new experimental plan for use in another iteration of the design of experiments method for further optimization of said read parameters, wherein said predetermined criterion comprises coefficient values of quadratic terms of a second-order model used for determining the optimized read parameters by said optimization means.

4. Apparatus as claimed in claim 3,
wherein said optimization means comprise:
- test reading means for performing test readings from said record carrier or a test record carrier a predetermined number of times using variations of said initial read parameters as set in the variable levels and the experimental plan used by the design of experiments method,
- measurement means for measuring a quality parameter value of a quality parameter for each test reading indicating the reading quality of said test reading, and
- determination means for determining optimized read parameters by evaluation of the measured quality parameter values for said test readings.

5. Apparatus as claimed in claim 2,
wherein said determination means are adapted for determining the optimized write strategy parameters by use of the second-order model, and by determining an optimum, corresponding to a minimum, of said model.

6. Apparatus as claimed in claim 2,
wherein said measurement means are adapted for using jitter, block error rate or bit error rate as quality parameter and for measuring the jitter value after each test recording and test reading, respectively.

7. Apparatus as claimed in claim 1,
wherein said setting means are adapted for setting a predetermined number of experiments, corresponding to a quantity of (9+4·n) experiments, where n=0, 1, 2, . . . , in said experimental plan to be used in said design of experiments method.

8. Apparatus as claimed in claim 7,
wherein said setting means are adapted for setting thirteen experiments in said experimental plan to be used in said design of experiments method.

9. Apparatus as claimed in claim 1,
wherein said setting means are adapted for setting said initial variable levels and said initial experimental plan, based on variations of a predetermined number of said initial parameters.

10. Apparatus as claimed in claim 1,
wherein said iteration means are adapted for using one or more coefficient values of a model used for determining the optimized parameters by said optimization means in said predetermined criterion for checking if the optimized parameters shall be further optimized, said predetermined criterion comprising threshold values for said coefficient values.

11. Apparatus as claimed in claim 1,
wherein said iteration means are adapted for determining new variable levels and a new experimental plan based on one or more coefficient values of the second order model used for determining the optimized parameters by said optimization means.

12. Apparatus for determining write strategy parameters for recording data on an optical record carrier, comprising:
- initialization means for setting initial write strategy parameters,
- setting means for setting initial variable levels and an initial experimental plan, based on variations of said initial write strategy parameters, for use in a design of experiments method for optimization of said write strategy parameters,
- optimization means for determining optimized write strategy parameters by use of a design of experiments method, and
- iteration means for checking if, based on a predetermined criterion, the optimized write strategy parameters determined by the optimization means shall be further optimized and, in case the write strategy parameters shall be further optimized, for determining new variable levels and a new experimental plan for use in another iteration of the design of experiments method for further optimization of said write strategy parameters,
- wherein said iteration means are adapted for determining new variable levels and a new experimental plan based on one or more coefficient vales of a model used for determining the optimized parameters by said optimization means, and
- wherein said iteration means are adapted for determining new variable levels and a new experimental plan based on the quadratic coefficient values of a second-order model.

13. Apparatus as claimed in claim 11,
wherein said iteration means are adapted for determining new variable levels by increasing, decreasing and/or shifting the previous variable levels based on said one or more coefficient values and for determining a new experimental plan based on said new variable levels.

14. Apparatus as claimed in claim 1,
wherein said initial parameters includes parameters stored in an Absolute Address In Pregroove (ADIP) information or two classes of default parameters stored in a media table in the drive selected based on ADIP information.

15. Method for determining write strategy parameters for recording data on an optical record carrier, comprising the steps of:
- setting initial write strategy parameters, initial variable levels and an initial experimental plan for use in a design of experiments method for optimization of said write strategy parameters,
- determining optimized write strategy parameters by use of a design of experiments method,
- checking if, based on a predetermined criterion, the determined optimized write strategy parameters shall be further optimized, wherein said predetermined criterion comprises coefficient values of quadratic terms of a second-order model used for determining the optimized write strategy parameters by said optimization means, and
- determining, in case the write strategy parameters shall be further optimized, new initial variables and a new initial experimental plan for use in another iteration of the design of experiments method for further optimization of said write strategy parameters.

16. Method for determining read parameters for reading data from an optical record carrier, comprising the steps of:
setting initial read parameters, initial variable levels and an initial experimental plan for use in a design of experiments method for optimization of said read parameters,
determining optimized read parameters by use of a design of experiments method,
checking if, based on a predetermined criterion, the determined optimized read parameters shall be further optimized, wherein said predetermined criterion comprises coefficient values of quadratic terms of a second-order model used for determining the optimized read parameters by said optimization means, and
determining, in case the read parameters shall be further optimized, new initial variables and a new initial experimental plan for use in another iteration of the design of experiments method for further optimization of said read parameters.

17. Apparatus for determining servo parameters for recording data on and/or reading data from an optical record carrier, comprising:
initialization means for setting initial servo parameters,
setting means for setting initial variable levels and an initial experimental plan, based on variations of said initial servo parameters, for use in a design of experiments method for optimization of said servo parameters,
optimization means for determining optimized servo parameters by use of a design of experiments method, and
iteration means for checking if, based on a predetermined criterion, the optimized servo parameters determined by the optimization means shall be further optimized and, in case the servo parameters shall be further optimized, for determining new variable levels and a new experimental plan for use in another iteration of the design of experiments method for further optimization of said servo parameters, wherein said predetermined criterion comprises coefficient values of quadratic terms of a second-order model used for determining the optimized servo parameters by said optimization means.

18. Apparatus as claimed in claim 17,
wherein said servo parameters include the focus offset, the radial tilt calibration, the spherical aberration, tangential tilt and/or radial offset.

19. Method for determining servo parameters for recording data on and/or reading data from an optical record carrier, comprising:
setting initial servo parameters,
setting initial variable levels and an initial experimental plan, based on variations of said initial servo parameters, for use in a design of experiments method for optimization of said servo parameters,
determining optimized servo parameters by use of a design of experiments method,
checking if, based on a predetermined criterion, the optimized servo parameters shall be further optimized, wherein said predetermined criterion comprises coefficient values of quadratic terms of a second-order model used for determining the optimized servo parameters by said optimization means, and
determining, in case the servo parameters shall be further optimized, new variable levels and a new experimental plan for use in another iteration of the design of experiments method for further optimization of said servo parameters.

* * * * *